(12) United States Patent
Chaffee

(10) Patent No.: US 7,165,044 B1
(45) Date of Patent: *Jan. 16, 2007

(54) INVESTMENT PORTFOLIO TRACKING SYSTEM AND METHOD

(75) Inventor: Arthur Willard Chaffee, Del Mar, CA (US)

(73) Assignee: Summa LP Applications, Del Mar, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 236 days.

(21) Appl. No.: 09/410,825

(22) Filed: Oct. 1, 1999

(51) Int. Cl.
*G06Q 40/00* (2006.01)

(52) U.S. Cl. .................. 705/37; 705/35; 705/36 R; 705/36 T

(58) Field of Classification Search ............ 705/35–37, 705/30
See application file for complete search history.

(56) References Cited

U.S. PATENT DOCUMENTS

| | | |
|---|---|---|
| 4,334,270 A | 6/1982 | Towers |
| 4,346,442 A | 8/1982 | Musmanno |
| 4,376,978 A | 3/1983 | Musmanno |
| 4,799,156 A | 1/1989 | Shavit et al. |
| 4,823,265 A | 4/1989 | Nelson |
| 4,953,085 A | 8/1990 | Atkins |
| 5,021,976 A | 6/1991 | Wexelblat et al. |
| 5,132,899 A | 7/1992 | Fox |
| 5,245,535 A | 9/1993 | Weiss et al. |
| 5,270,922 A | 12/1993 | Higgins |
| 5,471,575 A | 11/1995 | Giansante |
| 5,517,406 A | 5/1996 | Harris et al. |
| 5,644,727 A | 7/1997 | Atkins |
| 5,706,502 A | 1/1998 | Foley |
| 5,819,238 A | 10/1998 | Fernholz |
| 5,826,878 A | 10/1998 | Kiyosaki et al. |
| 5,842,185 A | 11/1998 | Chancey et al. |
| 5,875,435 A | 2/1999 | Brown |
| 5,890,158 A | 3/1999 | House |
| 5,893,079 A | 4/1999 | Cwenar |

(Continued)

FOREIGN PATENT DOCUMENTS

GB           2308692 A    *   9/1997

(Continued)

OTHER PUBLICATIONS

Advent Software: Solutions for Growing Investment Advisors—Business Challenges, Aug. 17, 1999, pp. 1-3.

(Continued)

*Primary Examiner*—Hyung Sub Sough
*Assistant Examiner*—Narayanswamy Subramanian
(74) *Attorney, Agent, or Firm*—Foley & Lardner LLP

(57) ABSTRACT

Accounting and financial analyses are performed for an investment portfolio to produce comprehensive reports on the performance and/or current real net worth of this investment portfolio. These reports are generated in response to a user request that is received over the Internet based on automatically based on security price data retrieved from a real-time security price reporting service and transaction records of the investment portfolio that are retrieved from one or more of the user's trading accounts that are kept at different financial institutions. As a result, a single financial report that is representative of the collective performance of different accounts in different financial institutions can be generated.

72 Claims, 46 Drawing Sheets

U.S. PATENT DOCUMENTS

| | | | |
|---|---|---|---|
| 5,903,881 A | 5/1999 | Schrader et al. | |
| 5,911,136 A | 6/1999 | Atkins | |
| 5,918,217 A | 6/1999 | Maggioncalda et al. | |
| 5,926,822 A | 7/1999 | Garman | |
| 5,963,925 A | 10/1999 | Kolling et al. | |
| 6,058,375 A * | 5/2000 | Park | 705/30 |
| 6,154,729 A * | 11/2000 | Cannon et al. | 705/35 |
| 6,173,270 B1 | 1/2001 | Cristofich et al. | |
| 6,236,980 B1 * | 5/2001 | Reese | 705/36 |
| 6,275,813 B1 * | 8/2001 | Berka | 705/30 |
| 6,324,523 B1 * | 11/2001 | Killeen et al. | 705/35 |
| 6,442,533 B1 * | 8/2002 | Hinkle | 705/35 |
| 2002/0026394 A1 * | 2/2002 | Savage et al. | 705/34 |
| 2002/0065752 A1 * | 5/2002 | Lewis | 705/35 |
| 2003/0050877 A1 * | 3/2003 | Blasnik et al. | 705/30 |
| 2003/0158798 A1 * | 8/2003 | Green | 705/30 |

FOREIGN PATENT DOCUMENTS

| | | | |
|---|---|---|---|
| JP | 11007476 A * | 1/1999 | |

OTHER PUBLICATIONS

Advent Software: The Open GL Interface, Aug. 17, 1999, pp. 1-2.
Advent Software: Axys Release 3—Raising the Standard in Portfolio Management, Aug. 17, 1999, pp. 1-6.
Centerpiece eReports Web Site Report Publishing, Aug. 17, 1999, pp. 1-2.
Centerpiece Sample Reports, Aug. 17, 1999, pp. 1-2.
Centerpiece Sample Reports, Portfolio Statement, Aug. 17, 1999, pp. 1-2.
Centerpiece Sample Reports, Portfolio Position Analysis, Aug. 17, 1999, pp. 1-2.
Centerpiece Sample Reports, Asset Allocation, Aug. 17, 1999, pp. 1-2.
Centerpiece Sample Reports, Income Report, Aug. 17, 1999, p. 1-2.
Centerpiece Sample Reports, Realized Gains & Losses, Aug. 17, 1999, pp. 1-2.
Centerpiece Sample Reports, Comparative Portfolio Performance Report, Aug. 17, 1999, pp. 1-2.
Centerpiece Sample Reports, Portfolio Performance Summary, Aug. 17, 1999, pp. 1-4.
Centerpiece Sample Reports, Portfolio Performance Review, Aug. 17, 1999, pp. 1-4.
Centerpiece Sample Reports, Portfolio Rebalancing Report, Aug. 17, 1999, pp. 1-2.
Centerpiece Sample Reports, Cross-Reference by Securities, Aug. 17, 1999, pp. 1-2.
Centerpiece Sample Reports, Global Maturity Report, Aug. 17, 1999, pp. 1-2.
Financial Statement & Net Worth, Dec. 15, 1998, p. 1.1.
Schedule D Worksheet, Dec. 15, 1998, p. 18.1.
Internal Rate of Return Report, Dec. 15, 1998, p. 13.1.
Randall Smith, So Far, E-Underwriting Gets a Slow Start, The Wall Street Journal, Aug. 13, 1999, pp. C1, C10.
Harbinger ad, The Wall Street Journal, Jul. 30, 1999, p. A9.
American Express ad, The Wall Street Journal, Jul. 30, 1999, p. A11.
Island ad, The Wall Street Journal, Jul. 29, 1999, p. A25.
Discover Brokerage ad, The Wall Street Journal, Aug. 10, 1999, p. A5.
Instinet ad, The Wall Street Journal, Jul. 29, 1999, pp. A7-A9.
iPlanet ad, The Wall Street Journal, Jul. 29, 1999, p. B13.
Web St. ad, The Wall Street Journal, Jul. 27, 1999, p. A5.
Greg Ip, The Stock Exchanges, Long Static, Suddenly Are Roiled by Change, Jul. 27, 1999, pp. A1, A10.
David Hamilton, Sun Makes Headway in New Business Software, The Wall Street Journal, date unknown.
Advent Software, Inc., AXYS Portfolio Reports Release 3, Feb. 1999, pp. 1-20.
Carol Marie Cropper, Online Trading Changes Landscape for Old-Line Brokerage Firms, The New York Times on the Web, Sep. 22, 1999, pp. 1-5.
Web's Best Bank & Investment Sites, vol. 5, Issue 9, 1999.
IRS Schedule D (1998), "Capital Gains and Losses".

* cited by examiner

REGISTRATION

Please select a username and password:
Username: _____
Password: _____

Please enter your contact information:
Company name (if any): _____
Address: _____
Telephone: _____
E-mail: _____

Specify the service plan you would like sign up for:
- ○ Consultant    $ _ _ . _ _ /mo.
- ○ Professional    $ _ _ . _ _ /mo.
- ● Individual    $ _ _ . _ _ /mo.

Specify payment method:
  ○ Visa    ○ MasterCard    ○ American Express

Specify credit card number and expiration date:
[ Credit Card Number ] [ Exp. ]

[ SUBMIT ] [ RESET ]

Figure 3

GENERAL INFORMATION

User: AWC

Company: ARM

Tax Rates:
|  | Short | Long |
|---|---|---|
| State | 10% | 8% |
| Federal | 40% | 20% |

Interest Compounded:
- (x) Daily
- ( ) Monthly

Porfolios: View 121   Add 122   Edit 123   Delete 124

| AWC |
| XYZ |
| ALL |
— 126

125 — Tax Payments     Manual Inputs — 127

Figure 4

TAX PAYMENTS

| Date | State | Federal | | | Balance |
|---|---|---|---|---|---|
| 6/13/1999 | 400.00 | | | | 400.00 |
| 6/15/1999 | | 1,000.00 | | | 1,400.00 |
| | | | | | 1,400.00 |

Figure 6

BOUGHT / TRANSFERRED-IN

| Reference Number | 28231 | Symbol | HSY | Bought Date | 4/7/1999 |
|---|---|---|---|---|---|
| Exchange | NYSE | Type | Common | Portfolio Name | AWC |

Select One:
- (x) Long Position
- ( ) Short Position

| | | Bought Disbursements: | |
|---|---|---|---|
| Bought Price | 55.688 | Cash Disbursed | 2,631.25 |
| Shares | 100.0 | Margin Proceeds | 3,000.05 |
| Commissions | 50.00 | Margin Alert % | 45.00% |
| Other Costs | 12.50 | | |
| Settlement Amoun | 5,631.30 | | |

Figure 7A

SOLD FORM

| | | | | |
|---|---|---|---|---|
| Reference Number | 28231 | Symbol | HSY | Sold Date 6/10/1999 |
| Exchange | NYSE | Type | Common | Portfolio Name AWC |

Sold Price 53.688

Shares 100.0

Commissions 35.00

Other Costs 16.43

Disbursement Amount 5,317.37

Select One:
- (x) Long Position
- ( ) Short Position

Disbursements Receipts:

Cash Disbursed 2,317.32

Margin Proceeds 3,000.05

Figure 7B

MARGIN CHANGE

Reference Number: 28231   Symbol: HSY

Exchange: NYSE   Type: Common   Portfolio Name: AWC

| Date | Proceeds | Payments |
|---|---|---|
| 4/25/1999 | | 2,000.00 |
| 5/10/1999 | 1,000.00 | |
| 0/0/0 | | |
| | 1,000.00 | 2,000.00 |

Figure 7C

DIVIDENDS

Reference Number: 28231　　Symbol: HSY　　Portfolio Name: AWC

Exchange: NYSE　　Type: Common

| Date |  | Cash | Shares |
|---|---|---|---|
| Declared | Received | | |
| 4/25/1999 | 4/25/1999 | | 5.0 |
| 5/10/1999 | 5/10/1999 | 200.00 | |
| 0/0/0 | 0/0/0 | | |
| | | 200.00 | 5.00 |

Figure 7D

STOCK SPLITS

Reference Number: 28231  Symbol: HSY  Portfolio Name: AWC

Exchange: NYSE  Type: Common

| Date | Shares Released | Stock Received | Split Type | Split Ratio |
|---|---|---|---|---|
| 5/28/1999 | 100.0 | 200.0 | Normal | 2 for 1 |
| 6/2/1999 | 200.0 | 100.0 | Reverse | 1 for 2 |
| | | | | |
| | 300.00 | 300.00 | | |

Figure 7E

CASH ACTIVITY

| Date | Deposits | Interest | Withdrawals | Balance |
|---|---|---|---|---|
| 4/2/1999 | 5,000.00 | | | 5,000.00 |
| 5/2/1999 | | 33.00 | | 5,033.00 |
| 6/7/1999 | | | (3,000.00) | 2,033.00 |
| 6/10/1999 | | | | 2,033.00 |

Figure 7F

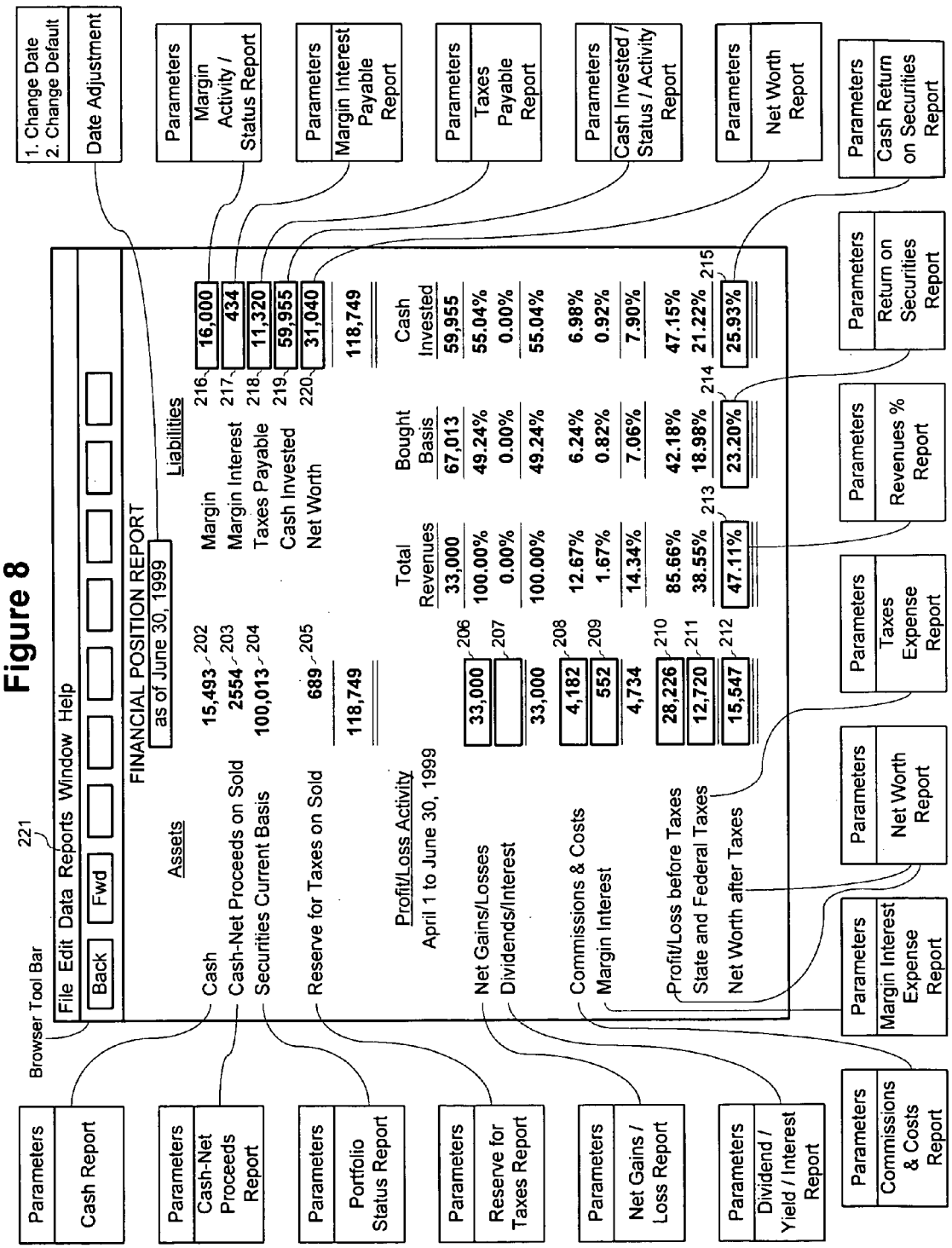

BOUGHT / TRANSFERRED IN REPORT PARAMETERS

Date Range [4/1/1999] to [6/30/1999]

Stock Selection:

- Long Positions ○
- Short Positions ○     Pick Stocks [ALL ▼]
- Gain Positions ○
- Loss Positions ○     Short-Term ○
- Portfolio [AWC ▼]     Long-Term ○     [Proceed]

BOUGHT / TRANSFERRED IN REPORT
April 1, 1999 through June 30, 1999

| Reference Number | Symbol | Positon | Date | Shares | Price | Amount | Commissions & Costs Amount | % | Basis |
|---|---|---|---|---|---|---|---|---|---|
| 28231 | HSY | Long | 4/7/1999 | 100 | 55.688 | 5,568.75 | 62.50 | 1.12% | 5,631.25 |
| 47104 | EXDS | | 4/23/1999 | 100 | 74.000 | 7,400.00 | 102.50 | 1.39% | 7,502.50 |
| - | HSY | | 4/20/1999 | 100 | 55.000 | 5,500.00 | 102.50 | 1.86% | 5,602.50 |
| 88682 | EXDS | | 4/26/1999 | 100 | 81.500 | 8,150.00 | 102.50 | 1.26% | 8,252.50 |
| 37751 | EMBU | | 4/22/1999 | 5,000 | 0.830 | 4,150.00 | 50.00 | 1.20% | 4,200.00 |
| 37728 | EMBU | | 4/22/1999 | 10,000 | 0.810 | 8,100.00 | 152.50 | 1.88% | 8,252.50 |
| 36694 | EXDS | | 4/27/1999 | 50 | 105.000 | 5,250.00 | 102.50 | 1.95% | 5,352.50 |
| 69811 | BEAM | | 4/23/1999 | 1,000 | 16.063 | 16,062.50 | 202.50 | 1.26% | 16,265.00 |
| 47892 | EBAY | | 4/27/1999 | 50 | 214.875 | 10,743.75 | 102.50 | 0.95% | 10,846.25 |
| 86388 | INTC | | 5/3/1999 | 500 | 62.875 | 31,437.50 | 102.50 | 0.33% | 31,540.00 |
| 80027 | MCK | | 5/13/1999 | 200 | 37.375 | 7,475.00 | 102.50 | 1.37% | 7,577.50 |
| 83194 | BEAM | | 5/27/1999 | 1,000 | 16.750 | 16,750.00 | 252.50 | 1.51% | 17,002.50 |
| 26444 | BEAM | | 6/2/1999 | 1,000 | 18.250 | 18,250.00 | 252.50 | 1.38% | 18,502.50 |
| 27475 | EMBU | | 6/2/1999 | 10,000 | 1.205 | 12,050.00 | 102.50 | 0.85% | 12,152.50 |
| 92731 | EBAY | | 6/4/1999 | 50 | 162.313 | 8,115.63 | 102.50 | 1.26% | 8,218.13 |
| - | UAL | | 6/9/1999 | 100 | 65.563 | 6,556.25 | 102.50 | 1.56% | 6,658.75 |
| 46520 | TSEMF | | 6/10/1999 | 400 | 7.250 | 2,900.00 | 26.66 | 0.92% | 2,926.66 |
| 46518 | TSEMF | | 6/10/1999 | 100 | 7.125 | 712.50 | 6.67 | 0.94% | 719.17 |
| 46509 | TSEMF | | 6/10/1999 | 1,000 | 7.125 | 7,125.00 | 77.58 | 1.09% | 7,202.58 |
| 50069 | ANSI | | 6/24/1999 | 1,000 | 8.875 | 8,875.00 | 99.00 | 1.12% | 8,974.00 |
| 53199 | BEAM | | 6/29/1999 | 1,000 | 20.000 | 20,000.00 | 184.00 | 0.92% | 20,184.00 |
| 54801 | PBJHA | | 6/29/1999 | 4,000 | 0.375 | 1,500.00 | 184.00 | 12.27% | 1,684.00 |
| | | | | | | 212,671.88 | 2,575.41 | 1.21% | 215,247.29 |

[Print]     [Graph]

Figure 9A

SOLD / TRANSFERRED OUT REPORT PARAMETERS

Date Range  4/1/1999  to  6/30/1999

Stock Selection:
- Long Positions ○
- Short Positions ○   Pick Stocks [ ALL ▼ ]
- Gain Positions ○
- Loss Positions ○   Short-Term ○
- Portfolio [ AWC ▼ ]   Long-Term ○   [ Proceed ]

SOLD / TRANSFERRED OUT REPORT
April 1, 1999 through June 30, 1999

| Reference Number | Symbol | Position | Date | Shares | Price | Amouint | Commissions & Costs Amount | % | Basis |
|---|---|---|---|---|---|---|---|---|---|
| 46512 | HSY | Long | | 100 | - | - | - | 0.00% | - |
| 80009 | EXDS | Long | | 100 | 92.625 | 9,262.50 | 102.81 | 1.11% | 9,365.31 |
| 46512 | HSY | Long | | 100 | 65.000 | 6,500.00 | 102.81 | 1.58% | 6,602.81 |
| 96460 | EXDS | Long | | 100 | 92.000 | 9,200.00 | 134.31 | 1.46% | 9,334.31 |
| 0 | EMBU | Long | | 5,000 | - | - | - | 0.00% | - |
| 0 | EMBU | Long | | 10,000 | - | - | - | 0.00% | - |
| 53177 | EXDS | Long | | 50 | 107.563 | 5,378.13 | 134.18 | 2.49% | 5,512.31 |
| 35765 | BEAM | Long | | 1,000 | 18.375 | 18,375.00 | 153.12 | 0.83% | 18,528.12 |
| - | EBAY | Long | | 50 | 124.500 | 6,225.00 | 35.00 | 0.56% | 6,260.00 |
| 53896 | INTC | Long | | 500 | 61.875 | 30,937.50 | 103.54 | 0.33% | 31,041.04 |
| - | MCK | Long | | 200 | 32.500 | 6,500.00 | 35.00 | 0.54% | 6,535.00 |
| - | BEAM | Long | | 1,000 | 22.563 | 22,562.50 | 553.26 | 2.45% | 23,115.76 |
| 90282 | BEAM | Long | | 1,000 | 19.563 | 19,562.50 | 153.12 | 0.78% | 19,715.62 |
| 0 | EMBU | Long | | 10,000 | - | - | - | 0.00% | - |
| - | EBAY | Long | | 50 | - | - | - | 0.00% | - |
| 0 | UAL | Long | | 100 | - | - | - | 0.00% | - |
| 49972 | TSEMF | Long | | 400 | 7.438 | 2,975.00 | 10.90 | 0.37% | 2,985.90 |
| 49972 | TSEMF | Long | | 100 | 7.438 | 743.75 | 10.90 | 1.47% | 754.65 |
| 49923 | TSEMF | Long | | 1,000 | 7.438 | 7,437.50 | 77.58 | 1.04% | 7,515.08 |
| 0 | ANSI | Long | | 1,000 | - | - | - | 0.00% | - |
| | | | | | | 145,659.38 | 1,606.53 | 1.10% | 147,265.91 |

[ Print ]   [ Graph ]

Figure 9B

MARGIN ALERT REPORT PARAMETERS

Date: 4/1/1999

Stock Selection:
- Long Positions ○
- Short Positions ○      Pick Stocks [ALL ▼]
- Gain Positions ○
- Loss Positions ○     Short-Term ○
- Portfolio [AWC ▼]     Long-Term ○     [Proceed]

MARGIN ALERT REPORT
June 30, 1999

| Reference Number | Symbol | Current Basis | Margin Balance | Cash Invested | Current Margin % | Margin Alert % | Difference | Margin Alert |
|---|---|---|---|---|---|---|---|---|
| 28231 | HSY | 7,320.99 | 3,000.00 | 4,320.99 | 40.98% | 45.00% | 4.02% | |
| 47104 | EXDS | - | - | - | 0.00% | 45.00% | 45.00% | |
| - | HSY | - | - | - | 0.00% | 45.00% | 45.00% | |
| 88682 | EXDS | - | - | - | 0.00% | 45.00% | 45.00% | |
| 37751 | EMBU | 10,050.00 | - | 10,050.00 | 0.00% | 45.00% | 45.00% | |
| 37728 | EMBU | 20,152.50 | - | 20,152.50 | 0.00% | 45.00% | 45.00% | |
| 36694 | EXDS | - | - | - | 0.00% | 45.00% | 45.00% | |
| 69811 | BEAM | - | - | - | 0.00% | 45.00% | 45.00% | |
| 47892 | EBAY | - | - | - | 0.00% | 45.00% | 45.00% | |
| 86388 | INTC | - | - | - | 0.00% | 45.00% | 45.00% | |
| 80027 | MCK | - | - | - | 0.00% | 45.00% | 45.00% | |
| 83194 | BEAM | - | - | - | 0.00% | 45.00% | 45.00% | |
| 26444 | BEAM | - | - | - | 0.00% | 45.00% | 45.00% | |
| 27475 | EMBU | 20,102.50 | - | 20,102.50 | 0.00% | 45.00% | 45.00% | |
| 92731 | EBAY | 9,014.15 | 4,000.00 | 5,014.15 | 44.37% | 45.00% | 0.63% | |
| - | UAL | 6,502.50 | - | 6,502.50 | 0.00% | 45.00% | 45.00% | |
| 46520 | TSEMF | - | - | - | 0.00% | 45.00% | 45.00% | |
| 46518 | TSEMF | - | - | - | 0.00% | 45.00% | 45.00% | |
| 46509 | TSEMF | - | - | - | 0.00% | 45.00% | 45.00% | |
| 50069 | ANSI | 11,474.00 | - | 11,474.00 | 0.00% | 45.00% | 45.00% | |
| 53199 | BEAM | 25,485.22 | 9,000.00 | 16,485.22 | 35.31% | 45.00% | 9.69% | |
| 54801 | PBJHA | 1,684.00 | - | 1,684.00 | 0.00% | 45.00% | 45.00% | |
| | | 111,785.87 | 16,000.00 | 95,785.87 | 14.31% | 45.00% | 30.69% | |

[Print]   [Graph]

Figure 9C

HOLDING PERIOD REPORT PARAMETERS

Date Range  [4/1/1999]  to  [6/30/1999]

Stock Selection:

Long Positions    ○

Short Positions    ○      Pick Stocks    [ALL ▼]

Gain Positions    ○

Loss Positions    ○      Short-Term    ○

Portfolio    [AWC ▼]      Long-Term    ○    [Proceed]

HOLDING PERIOD REPORT
April 1, 1999 through June 30, 1999

| Reference Number | Symbol | Position | Date Purchase | Date Sold | Shares | Price | Amount | Period Held Months | Period Held Days |
|---|---|---|---|---|---|---|---|---|---|
| 28231 | HSY | Long | 4/7/1999 | | 100 | 55.688 | 5,568.75 | 5 | 19 |
| 37751 | EMBU | Long | 4/22/1999 | | 5,000 | 0.830 | 4,150.00 | 5 | 4 |
| 37728 | EMBU | Long | 4/22/1999 | | 10,000 | 0.810 | 8,100.00 | 5 | 4 |
| 36694 | EXDS | Long | 4/27/1999 | 6/29/1999 | 50 | 105.000 | 5,250.00 | 2 | 3 |
| 47892 | EBAY | Long | 4/27/1999 | 6/14/1999 | 50 | 214.875 | 10,743.75 | 1 | 18 |
| 80027 | MCK | Long | 5/13/1999 | 6/14/1999 | 200 | 37.375 | 7,475.00 | 1 | 2 |
| 83194 | BEAM | Long | 5/27/1999 | 5/27/1999 | 1,000 | 16.750 | 16,750.00 | 0 | 1 |
| 26444 | BEAM | Long | 6/2/1999 | 6/4/1999 | 1,000 | 18.250 | 18,250.00 | 0 | 2 |
| 27475 | EMBU | Long | 6/2/1999 | | 10,000 | 1.205 | 12,050.00 | 3 | 23 |
| 92731 | EBAY | Long | 6/4/1999 | | 50 | 162.313 | 8,115.63 | 3 | 21 |
| - | UAL | Long | 6/9/1999 | | 100 | 65.563 | 6,556.25 | 3 | 16 |
| 46520 | TSEMF | Long | 6/10/1999 | 6/24/1999 | 400 | 7.250 | 2,900.00 | 0 | 14 |
| 46518 | TSEMF | Long | 6/10/1999 | 6/24/1999 | 100 | 7.125 | 712.50 | 0 | 14 |
| 46509 | TSEMF | Long | 6/10/1999 | 6/24/1999 | 1,000 | 7.125 | 7,125.00 | 0 | 14 |
| 50069 | ANSI | Long | 6/24/1999 | | 1,000 | 8.875 | 8,875.00 | 3 | 1 |
| 53199 | BEAM | Long | 6/29/1999 | | 1,000 | 20.000 | 20,000.00 | 2 | 26 |
| 54801 | PBJHA | Long | 6/29/1999 | | 4,000 | 0.375 | 1,500.00 | 2 | 26 |
| | | | | | | | 144,121.88 | | |

[Print]  [Graph]

Figure 9D

DIVIDEND REPORT PARAMETERS

Date Range  [4/1/1999]  to  [6/30/1999]

Stock Selection:
- Long Positions  ○
- Short Positions  ○      Pick Stocks
- Gain Positions  ○
- Loss Positions  ○      Short-Term  ○
- Portfolio  [AWC ▼]  Long-Term  ○  [Proceed]

DIVIDEND REPORT
April 1, 1999 through June 30, 1999

| Reference Number | Symbol | Date Declared | Date Received | Value at Dividend Date | Cash Dividend | Dividend % | Shares Dividend | Shares Value | Dividend % |
|---|---|---|---|---|---|---|---|---|---|
| 28231 | HSY | 4/7/1999 | 3/15/1999 | 5,000 | 300.000 | 6.00% | | | |
| 37751 | EMBU | 4/22/1999 | 5/1/1999 | 8,000 | | 0.00% | 100.000 | 350.00 | 4.38% |
| 37728 | EMBU | 4/22/1999 | 5/1/1999 | 6,000 | 150.000 | 2.50% | | | 0.00% |
| 36694 | EXDS | 4/27/1999 | 6/29/1999 | 2,000 | 105.000 | 5.25% | | | 0.00% |
| 47892 | EBAY | 4/27/1999 | 6/14/1999 | 1,000 | | 0.00% | 75.000 | 25.00 | 2.50% |
| 80027 | MCK | 5/13/1999 | 6/14/1999 | 4,000 | | 0.00% | 50.000 | 10.00 | 0.25% |
| | | | | | 555.00 | | 225.00 | | |

[Print]  [Graph]

Figure 9E

YIELD REPORT PARAMETERS

Date Range  [4/1/1999]  to  [6/30/1999]

Stock Selection:
- Long Positions  ○
- Short Positions  ○         Pick Stocks   [ALL ▼]
- Gain Positions  ○
- Loss Positions  ○         Short-Term    ○
- Portfolio       [AWC ▼]   Long-Term     ○       [Proceed]

YIELD REPORT
April 1, 1999 through April 30, 1999

| Reference Number | Symbol | Date Declared | Date Received | Current Value | Cash Dividend | Dividend % | Shares Dividend | Shares Value | Dividend % | Combined Cash/Stock Dividend | Securities Period Held Yield |
|---|---|---|---|---|---|---|---|---|---|---|---|
| 28231 | HSY  | 36257 | 36234 | 5393.481 | 100 | 0.0185409  |    |        | 0         | 100   | 1.162509 |
| 37751 | EMBU | 36272 | 36281 | 9159.69  |     | 0          | 20 | 92.625 | 0.0101122 | 1852.5 | 110.729 |
| 37728 | EMBU | 36272 | 36281 | 6397.19  | 75  | 0.0117239  |    |        | 0         | 75    | 5.581595 |
| 36694 | EXDS | 36277 | 36340 | 9065.69  | 85  | 0.00937601 |    |        | 0         | 85    | 1.770126 |
| 47892 | EBAY | 36277 | 36325 | 10050    |     | 0          | 15 | 2      | 0.000199  | 30    | 0.204749 |
|       |      |       |       |          | 260 |            | 35 |        |           |       |          |

[Print]   [Graph]

Figure 9F

COMMISSION REPORT PARAMETERS

Date Range [4/1/1999] to [6/30/1999]

Stock Selection:
- Long Positions ○
- Short Positions ○    Pick Stocks [ALL ▼]
- Gain Positions ○
- Loss Positions ○    Short-Term ○
- Portfolio [AWC ▼]    Long-Term ○    [Proceed]

COMMISSION PERIOD REPORT
April 1, 1999 through June 30, 1999

| Reference Number | Symbol | Bought Value | Bought Commissions & Cost Amount | % | Sold Value | Sold Commissions & Cost Amount | % | Total Comm & Costs | Gross Sold Total Comm & Costs % | Net Gain/Loss Total Comm & Costs % |
|---|---|---|---|---|---|---|---|---|---|---|
| 28231 | HSY | 5,568.75 | 62.50 | 1.12% | - | - | 0.00% | 62.50 | 0.00% | 0.00% |
| 47104 | EXDS | 7,400.00 | 102.50 | 1.39% | 9,262.50 | 102.81 | 1.11% | 205.31 | 2.17% | 11.02% |
| - | HSY | 5,500.00 | 102.50 | 1.86% | 6,500.00 | 102.81 | 1.58% | 205.31 | 3.06% | 20.53% |
| 88682 | EXDS | 8,150.00 | 102.50 | 1.26% | 9,200.00 | 134.31 | 1.46% | 236.81 | 2.51% | 22.55% |
| 37751 | EMBU | 4,150.00 | 50.00 | 1.20% | - | - | 0.00% | 50.00 | 0.00% | 0.00% |
| 37728 | EMBU | 8,100.00 | 152.50 | 1.88% | - | - | 0.00% | 152.50 | 0.00% | 0.00% |
| 36694 | EXDS | 5,250.00 | 102.50 | 1.95% | 5,378.13 | 134.18 | 2.49% | 236.68 | 4.22% | 184.73% |
| 69811 | BEAM | 16,062.50 | 202.50 | 1.26% | 18,375.00 | 153.12 | 0.83% | 355.62 | 1.90% | 15.38% |
| 47892 | EBAY | 10,743.75 | 102.50 | 0.95% | 6,225.00 | 35.00 | 0.56% | 137.50 | 2.16% | -3.04% |
| 86388 | INTC | 31,437.50 | 102.50 | 0.33% | 30,937.50 | 103.54 | 0.33% | 206.04 | 0.66% | -41.21% |
| 80027 | MCK | 7,475.00 | 102.50 | 1.37% | 6,500.00 | 35.00 | 0.54% | 137.50 | 2.07% | -14.10% |
| 83194 | BEAM | 16,750.00 | 252.50 | 1.51% | 22,562.50 | 553.26 | 2.45% | 805.76 | 3.45% | 13.86% |
| 26444 | BEAM | 18,250.00 | 252.50 | 1.38% | 19,562.50 | 153.12 | 0.78% | 405.62 | 2.03% | 30.90% |
| 27475 | EMBU | 12,050.00 | 102.50 | 0.85% | - | - | 0.00% | 102.50 | 0.00% | 0.00% |
| 92731 | EBAY | 8,115.63 | 102.50 | 1.26% | - | - | 0.00% | 102.50 | 0.00% | 0.00% |
| - | UAL | 6,556.25 | 102.50 | 1.56% | - | - | 0.00% | 102.50 | 0.00% | 0.00% |
| 46520 | TSEMF | 2,900.00 | 26.66 | 0.92% | 2,975.00 | 10.90 | 0.37% | 37.56 | 1.25% | 50.08% |
| 46518 | TSEMF | 712.50 | 6.67 | 0.94% | 743.75 | 10.90 | 1.47% | 17.57 | 2.31% | 56.22% |
| 46509 | TSEMF | 7,125.00 | 77.58 | 1.09% | 7,437.50 | 77.58 | 1.04% | 155.16 | 2.04% | 49.65% |
| 50069 | ANSI | 8,875.00 | 99.00 | 1.12% | - | - | 0.00% | 99.00 | 0.00% | 0.00% |
| 53199 | BEAM | 20,000.00 | 184.00 | 0.92% | - | - | 0.00% | 184.00 | 0.00% | 0.00% |
| 54801 | PBJHA | 1,500.00 | 184.00 | 12.27% | - | - | 0.00% | 184.00 | 0.00% | 0.00% |
| | | 212,671.88 | 2,575.41 | 1.21% | 145,659.38 | 1,606.53 | 1.10% | 4,181.94 | 2.79% | -6.24% |

[Print]    [Graph]

Figure 9G

PORTFOLIO STATUS REPORT PARAMETERS

Date: [6/30/1999] — 230

Stock Selection:

- Long Positions  ○
- Short Positions  ○          Pick Stocks  [ALL ▼]
- Gain Positions  ○
- Loss Positions  ○   /231    Short-Term  ○
- Portfolio  [AWC ▼]          Long-Term  ○    [Proceed]

---

PORTFOLIO STATUS REPORT
June 30, 1999

| Reference Number | Symbol | Positon | Date Bought | Date Sold | Shares | Bought Basis | Current Value | Gain / Loss | % Gain / Loss |
|---|---|---|---|---|---|---|---|---|---|
| 28231 | HSY | Long | 4/7/1999 |  | 100 | 5,631 | 5,200 | (431) | -7.66% |
| 47104 | EXDS |  | 4/23/1999 | 5/13/1999 | 100 | 7,503 | - | - | 0.00% |
| - | HSY |  | 4/20/1999 | 5/13/1999 | 100 | 5,603 | - | - | 0.00% |
| 88682 | EXDS |  | 4/26/1999 | 6/23/1999 | 100 | 8,253 | - | - | 0.00% |
| 37751 | EMBU |  | 4/22/1999 |  | 5,000 | 4,200 | 10,000 | 5,800 | 138.10% |
| 37728 | EMBU |  | 4/22/1999 |  | 10,000 | 8,253 | 20,000 | 11,748 | 142.35% |
| 36694 | EXDS |  | 4/27/1999 | 6/29/1999 | 50 | 5,353 | - | - | 0.00% |
| 69811 | BEAM |  | 4/23/1999 | 5/27/1999 | 1,000 | 16,265 | - | - | 0.00% |
| 47892 | EBAY |  | 4/27/1999 | 6/14/1999 | 50 | 10,846 | - | - | 0.00% |
| 86388 | INTC |  | 5/3/1999 | 5/5/1999 | 500 | 31,540 | - | - | 0.00% |
| 80027 | MCK |  | 5/13/1999 | 6/14/1999 | 200 | 7,578 | - | - | 0.00% |
| 83194 | BEAM |  | 5/27/1999 | 5/27/1999 | 1,000 | 17,003 | - | - | 0.00% |
| 26444 | BEAM |  | 6/2/1999 | 6/4/1999 | 1,000 | 18,503 | - | - | 0.00% |
| 27475 | EMBU |  | 6/2/1999 |  | 10,000 | 12,153 | 20,000 | 7,848 | 64.58% |
| 92731 | EBAY |  | 6/4/1999 |  | 50 | 8,218 | 6,225 | (1,993) | -24.25% |
| - | UAL |  | 6/9/1999 |  | 100 | 6,659 | 6,400 | (259) | -3.89% |
| 46520 | TSEMF |  | 6/10/1999 | 6/24/1999 | 400 | 2,927 | - | - | 0.00% |
| 46518 | TSEMF |  | 6/10/1999 | 6/24/1999 | 100 | 719 | - | - | 0.00% |
| 46509 | TSEMF |  | 6/10/1999 | 6/24/1999 | 1,000 | 7,203 | - | - | 0.00% |
| 50069 | ANSI |  | 6/24/1999 |  | 1,000 | 8,974 | 11,375 | 2,401 | 26.76% |
| 53199 | BEAM |  | 6/29/1999 |  | 1,000 | 20,184 | 19,313 | (872) | -4.32% |
| 54801 | PBJHA |  | 6/29/1999 |  | 4,000 | 1,684 | 1,500 | (184) | -10.93% |
|  |  |  |  |  |  | 215,247 | 100,013 | 24,057 | 11.18% |

[Print]   [Graph]

Figure 9H

CASH ACTIVITY / STATUS REPORT PARAMETERS

Date Range  [4/1/1999]  to  [6/30/1999]

Detail-Activity/Status  ○

Summary-Status  ○

[Proceed]

---

CASH ACTIVITY / STATUS REPORT
April 1, 1999 through June 30, 1999

| Reference Number | Cash Invested Date | Net Sale Proceeds Date | Symbol | Deposits | Cash Invested | Net Sale Proceeds | Withdrawals | Tax Payments | Balance |
|---|---|---|---|---|---|---|---|---|---|
|  |  |  |  |  |  |  |  |  | 5,000.00 |
| 28231 | 4/7/1999 |  | HSY | 2,631.25 | 2,631.25 | - |  |  | 5,000.00 |
| 47104 | 4/23/1999 | 5/13/1999 | EXDS | 4,502.50 | 4,502.50 | 9,365.31 | 6,000.00 |  | 8,365.31 |
| - | 4/20/1999 | 5/13/1999 | HSY | 3,102.50 | 3,102.50 | 6,602.81 | 6,602.81 |  | 8,365.31 |
| 88682 | 4/26/1999 | 6/23/1999 | EXDS | 8,252.50 | 8,252.50 | 9,334.31 | 9,334.31 |  | 8,365.31 |
| 37751 | 4/22/1999 |  | EMBU | 4,200.00 | 4,200.00 | - | - |  | 8,365.31 |
| 37728 | 4/22/1999 |  | EMBU | 8,252.50 | 8,252.50 | - | - |  | 8,365.31 |
| 36694 | 4/27/1999 | 6/29/1999 | EXDS | 5,352.50 | 5,352.50 | 5,512.31 | 5,512.31 |  | 8,365.31 |
| 69811 | 4/23/1999 | 5/27/1999 | BEAM | 16,265.00 | 16,265.00 | 18,528.12 | 10,000.00 |  | 16,893.43 |
| 47892 | 4/27/1999 | 6/14/1999 | EBAY | 5,846.25 | 5,846.25 | 6,260.00 | 6,260.00 |  | 16,893.43 |
| 86388 | 5/3/1999 | 5/5/1999 | INTC | 31,540.00 | 31,540.00 | 31,041.04 | 31,041.04 |  | 16,893.43 |
| 80027 | 5/13/1999 | 6/14/1999 | MCK | 4,577.50 | 4,577.50 | 6,535.00 | 6,535.00 |  | 16,893.43 |
| 83194 | 5/27/1999 | 5/27/1999 | BEAM | 9,002.50 | 9,002.50 | 23,115.76 | 23,115.76 |  | 16,893.43 |
| 26444 | 6/2/1999 | 6/4/1999 | BEAM | 10,502.50 | 10,502.50 | 19,715.62 | 19,715.62 |  | 16,893.43 |
| 27475 | 6/2/1999 |  | EMBU | 12,152.50 | 12,152.50 | - | - |  | 16,893.43 |
| 92731 | 6/4/1999 |  | EBAY | 4,218.13 | 4,218.13 | - | - |  | 16,893.43 |
| - | 6/9/1999 |  | UAL | 6,658.75 | 6,658.75 | - | - |  | 16,893.43 |
| 46520 | 6/10/1999 | 6/24/1999 | TSEMF | 2,926.66 | 2,926.66 | 2,985.90 | 2,985.90 |  | 16,893.43 |
| 46518 | 6/10/1999 | 6/24/1999 | TSEMF | 719.17 | 719.17 | 754.65 | 754.65 |  | 16,893.43 |
| 46509 | 6/10/1999 | 6/24/1999 | TSEMF | 7,202.58 | 7,202.58 | 7,515.08 | 7,515.08 |  | 16,893.43 |
|  | 6/13/1999 |  |  |  |  |  |  | 400.00 | 16,493.43 |
|  | 6/15/1999 |  |  |  |  |  |  | 1,000.00 | 15,493.43 |
| 50069 | 6/24/1999 |  | ANSI | 8,974.00 | 8,974.00 | - | - |  | 15,493.43 |
|  |  |  |  | 156,879.29 | 156,879.29 | 147,265.91 | 135,372.48 | 1,400.00 | 15,493.43 |

[Print]  [Graph]

Figure 9I

CASH INVESTED ACTIVITY / STATUS REPORT PARAMETERS

Date Range  [4/1/1999]  to  [6/30/1999]

Detail-Activity/Status  ○

Summary-Status  ○

[Proceed]

CASH INVESTED ACTIVITY / STATUS REPORT
April 1, 1999 through June 30, 1999
Detail

| Reference Number | Date Bought | Sold | Symbol | Bought | Sold | Borrowed | Repaid | Balance |
|---|---|---|---|---|---|---|---|---|
| 28231 | 4/7/1999 | | HSY | 2,631.25 | - | | | 2,631.25 |
| 47104 | 4/23/1999 | 5/13/1999 | EXDS | 4,502.50 | 4,502.50 | | | 2,631.25 |
| - | 4/20/1999 | 5/13/1999 | HSY | 3,102.50 | 3,102.50 | | | 2,631.25 |
| 88682 | 4/26/1999 | 6/23/1999 | EXDS | 8,252.50 | 8,252.50 | | | 2,631.25 |
| 37751 | 4/22/1999 | | EMBU | 4,200.00 | - | | | 6,831.25 |
| 37728 | 4/22/1999 | | EMBU | 8,252.50 | - | | | 15,083.75 |
| 36694 | 4/27/1999 | 6/29/1999 | EXDS | 5,352.50 | 5,352.50 | | | 15,083.75 |
| 69811 | 4/23/1999 | 5/27/1999 | BEAM | 16,265.00 | 16,265.00 | | | 15,083.75 |
| 47892 | 4/27/1999 | 6/14/1999 | EBAY | 5,846.25 | 5,846.25 | | | 15,083.75 |
| 86388 | 5/3/1999 | 5/5/1999 | INTC | 31,540.00 | 31,540.00 | | | 15,083.75 |
| 80027 | 5/13/1999 | 6/14/1999 | MCK | 4,577.50 | 4,577.50 | | | 15,083.75 |
| 83194 | 5/27/1999 | 5/27/1999 | BEAM | 9,002.50 | 9,002.50 | | | 15,083.75 |
| 26444 | 6/2/1999 | 6/4/1999 | BEAM | 10,502.50 | 10,502.50 | | | 15,083.75 |
| 27475 | 6/2/1999 | | EMBU | 12,152.50 | - | | | 27,236.25 |
| 92731 | 6/4/1999 | | EBAY | 4,218.13 | - | | | 31,454.38 |
| - | 6/9/1999 | | UAL | 6,658.75 | - | | | 38,113.13 |
| 46520 | 6/10/1999 | 6/24/1999 | TSEMF | 2,926.66 | 2,926.66 | | | 38,113.13 |
| 46518 | 6/10/1999 | 6/24/1999 | TSEMF | 719.17 | 719.17 | | | 38,113.13 |
| 46509 | 6/10/1999 | 6/24/1999 | TSEMF | 7,202.58 | 7,202.58 | | | 38,113.13 |
| 50069 | 6/24/1999 | | ANSI | 8,974.00 | - | | | 47,087.13 |
| 53199 | 6/29/1999 | | BEAM | 11,184.00 | - | | | 58,271.13 |
| 54801 | 6/29/1999 | | PBJHA | 1,684.00 | - | | | 59,955.13 |
| | | | | 169,747.29 | 109,792.16 | - | - | 59,955.13 |

[Print]  [Graph]

Figure 9J

MARGIN ACTIVITY / STATUS REPORT PARAMETERS

Date Range       4/1/1999    to    6/30/1999

Detail-Activity/Status    ○

Summary-Status    ○

[ Proceed ]

---

MARGIN ACTIVITY / STATUS REPORT
April 1, 1999 through June 30, 1999
Detail

| Reference Number | Date Bought | Sold | Symbol | Bought | Sold | Borrowed | Repaid | Balance |
|---|---|---|---|---|---|---|---|---|
| 28231 | 4/7/1999 |  | HSY | 3,000.00 | - |  |  | 3,000.00 |
| 47104 | 4/23/1999 | 5/13/1999 | EXDS | 3,000.00 | 3,000.00 |  |  | 3,000.00 |
| - | 4/20/1999 | 5/13/1999 | HSY | 2,500.00 | 2,500.00 |  |  | 3,000.00 |
| 88682 | 4/26/1999 | 6/23/1999 | EXDS | - | - |  |  | 3,000.00 |
| 37751 | 4/22/1999 |  | EMBU | - | - |  |  | 3,000.00 |
| 37728 | 4/22/1999 |  | EMBU | - | - |  |  | 3,000.00 |
| 36694 | 4/27/1999 | 6/29/1999 | EXDS | - | - |  |  | 3,000.00 |
| 69811 | 4/23/1999 | 5/27/1999 | BEAM | - | - |  |  | 3,000.00 |
| 47892 | 4/27/1999 | 6/14/1999 | EBAY | 5,000.00 | 5,000.00 |  |  | 3,000.00 |
| 86388 | 5/3/1999 | 5/5/1999 | INTC | - | - |  |  | 3,000.00 |
| 80027 | 5/13/1999 | 6/14/1999 | MCK | 3,000.00 | 3,000.00 |  |  | 3,000.00 |
| 83194 | 5/27/1999 | 5/27/1999 | BEAM | 8,000.00 | 8,000.00 |  |  | 3,000.00 |
| 26444 | 6/2/1999 | 6/4/1999 | BEAM | 8,000.00 | 8,000.00 |  |  | 3,000.00 |
| 27475 | 6/2/1999 |  | EMBU | - | - |  |  | 3,000.00 |
| 92731 | 6/4/1999 |  | EBAY | 4,000.00 | - |  |  | 7,000.00 |
| - | 6/9/1999 |  | UAL | - | - |  |  | 7,000.00 |
| 46520 | 6/10/1999 | 6/24/1999 | TSEMF | - | - |  |  | 7,000.00 |
| 46518 | 6/10/1999 | 6/24/1999 | TSEMF | - | - |  |  | 7,000.00 |
| 46509 | 6/10/1999 | 6/24/1999 | TSEMF | - | - |  |  | 7,000.00 |
| 50069 | 6/24/1999 |  | ANSI | - | - |  |  | 7,000.00 |
| 53199 | 6/29/1999 |  | BEAM | 9,000.00 | - |  |  | 16,000.00 |
| 54801 | 6/29/1999 |  | PBJHA | - | - |  |  | 16,000.00 |
|  |  |  |  | 45,500.00 | 29,500.00 | - | - | 16,000.00 |

[ Print ]        [ Graph ]

Figure 9K

MARGIN INTEREST EXPENSE REPORT

Date Range: 4/1/1999 to 6/30/1999

Stock Selection:
- Long Positions ○
- Short Positions ○        Pick Stocks [ALL ▼]
- Gain Positions ○
- Loss Positions ○         Short-Term ○
- Portfolio [AWC ▼]        Long-Term ○    [Proceed]

MARGIN INTEREST EXPENSE REPORT
April 1, 1999 through June 30, 1999

| Reference Number | Date Beginning | Date Ending | Symbol | Margin | Margin Interest | Interest Paid | Payable | Total Payable |
|---|---|---|---|---|---|---|---|---|
| 28231 | 4/7/1999 | | HSY | 3,000.00 | 2,058.50 | - | 2,058.50 | 2,058.50 |
| 47104 | 4/23/1999 | 5/13/1999 | EXDS | 3,000.00 | 15.00 | 15.00 | - | 2,058.50 |
| - | 4/20/1999 | 5/13/1999 | HSY | 2,500.00 | 14.38 | 14.38 | - | 2,058.50 |
| 88682 | 4/26/1999 | 6/23/1999 | EXDS | - | - | - | - | 2,058.50 |
| 37751 | 4/22/1999 | | EMBU | - | - | - | - | 2,058.50 |
| 37728 | 4/22/1999 | | EMBU | - | - | - | - | 2,058.50 |
| 36694 | 4/27/1999 | 6/29/1999 | EXDS | - | - | - | - | 2,058.50 |
| 69811 | 4/23/1999 | 5/27/1999 | BEAM | - | - | - | - | 2,058.50 |
| 47892 | 4/27/1999 | 6/14/1999 | EBAY | 5,000.00 | 60.00 | 60.00 | - | 2,058.50 |
| 86388 | 5/3/1999 | 5/5/1999 | INTC | - | - | - | - | 2,058.50 |
| 80027 | 5/13/1999 | 6/14/1999 | MCK | 3,000.00 | 24.00 | 24.00 | - | 2,058.50 |
| 83194 | 5/27/1999 | 5/27/1999 | BEAM | 8,000.00 | - | - | - | 2,058.50 |
| 26444 | 6/2/1999 | 6/4/1999 | BEAM | 8,000.00 | 4.00 | 4.00 | - | 2,058.50 |
| 27475 | 6/2/1999 | | EMBU | - | - | - | - | 2,058.50 |
| 92731 | 6/4/1999 | | EBAY | 4,000.00 | 2,686.66 | - | 2,686.66 | 4,745.16 |
| - | 6/9/1999 | | UAL | - | - | - | - | 4,745.16 |
| 46520 | 6/10/1999 | 6/24/1999 | TSEMF | - | - | - | - | 4,745.16 |
| 46518 | 6/10/1999 | 6/24/1999 | TSEMF | - | - | - | - | 4,745.16 |
| 46509 | 6/10/1999 | 6/24/1999 | TSEMF | - | - | - | - | 4,745.16 |
| 50069 | 6/24/1999 | | ANSI | - | - | - | - | 4,745.16 |
| 53199 | 6/29/1999 | | BEAM | 9,000.00 | 5,988.74 | - | 5,988.74 | 10,733.90 |
| 54801 | 6/29/1999 | | PBJHA | - | - | - | - | 10,733.90 |
| | | | | 45,500.00 | 10,851.28 | 117.38 | 10,733.90 | 10,733.90 |

[Print]   [Graph]

Figure 9L

MARGIN INTEREST PAYABLE REPORT

Date Range  [4/1/1999]  to  [6/30/1999]

Stock Selection:
- Long Positions  ○
- Short Positions  ○          Pick Stocks  [ALL ▼]
- Gain Positions  ○
- Loss Positions  ○           Short-Term  ○
- Portfolio       [AWC ▼]     Long-Term   ○    [Proceed]

---

MARGIN INTEREST PAYABLE REPORT
April 1, 1999 through June 30, 1999
Detail

| Reference Number | Date Beginning | Date Ending | Symbol | Margin | Margin Interest | Interest Paid | Payable | Total Payable |
|---|---|---|---|---|---|---|---|---|
| 28231 | 4/7/1999 |  | HSY | 3,000.00 | 2,058.52 | - | 2,058.52 | 2,058.52 |
| 47104 | 4/23/1999 | 5/13/1999 | EXDS | 3,000.00 | 15.00 | 15.00 | - | 2,058.52 |
| - | 4/20/1999 | 5/13/1999 | HSY | 2,500.00 | 14.38 | 14.38 | - | 2,058.52 |
| 88682 | 4/26/1999 | 6/23/1999 | EXDS | - | - | - | - | 2,058.52 |
| 37751 | 4/22/1999 |  | EMBU | - | - | - | - | 2,058.52 |
| 37728 | 4/22/1999 |  | EMBU | - | - | - | - | 2,058.52 |
| 36694 | 4/27/1999 | 6/29/1999 | EXDS | - | - | - | - | 2,058.52 |
| 69811 | 4/23/1999 | 5/27/1999 | BEAM | - | - | - | - | 2,058.52 |
| 47892 | 4/27/1999 | 6/14/1999 | EBAY | 5,000.00 | 60.00 | 60.00 | - | 2,058.52 |
| 86388 | 5/3/1999 | 5/5/1999 | INTC | - | - | - | - | 2,058.52 |
| 80027 | 5/13/1999 | 6/14/1999 | MCK | 3,000.00 | 24.00 | 24.00 | - | 2,058.52 |
| 83194 | 5/27/1999 | 5/27/1999 | BEAM | 8,000.00 | - | - | - | 2,058.52 |
| 26444 | 6/2/1999 | 6/4/1999 | BEAM | 8,000.00 | 4.00 | 4.00 | - | 2,058.52 |
| 27475 | 6/2/1999 |  | EMBU | - | - | - | - | 2,058.52 |
| 92731 | 6/4/1999 |  | EBAY | 4,000.00 | 2,686.70 | - | 2,686.70 | 4,745.22 |
| - | 6/9/1999 |  | UAL | - | - | - | - | 4,745.22 |
| 46520 | 6/10/1999 | 6/24/1999 | TSEMF | - | - | - | - | 4,745.22 |
| 46518 | 6/10/1999 | 6/24/1999 | TSEMF | - | - | - | - | 4,745.22 |
| 46509 | 6/10/1999 | 6/24/1999 | TSEMF | - | - | - | - | 4,745.22 |
| 50069 | 6/24/1999 |  | ANSI | - | - | - | - | 4,745.22 |
| 53199 | 6/29/1999 |  | BEAM | 9,000.00 | 5,988.82 | - | 5,988.82 | 10,734.03 |
| 54801 | 6/29/1999 |  | PBJHA | - | - | - | - | 10,734.03 |
|  |  |  |  | 45,500.00 | 10,851.41 | 117.38 | 10,734.03 | 10,734.03 |

[Print]    [Graph]

Figure 9M

GAIN / LOSS REPORT PARAMETERS

Date Range [4/1/1999] to [6/30/1999]     Report Format: [Gross Book-ME ▼]

Stock Selection:

- Long Positions ○
- Short Positions ○
- Gain Positions ○         Pick Stocks [ALL ▼]
- Loss Positions ○         Short-Term ○
- Portfolio [AWC ▼]        Long-Term ○     [Proceed]

GROSS BOOK GAIN / LOSS REPORT
MONTH END
April 1, 1999 through June 30, 1999

| Reference Number | Symbol | Position | Date Purchase | Date Sold | Months Held | Bought Value | Gross Gains / Loss Realized | Gross Gains / Loss Unrealized | Gross Gains / Loss Total | % Gain / Loss |
|---|---|---|---|---|---|---|---|---|---|---|
| 28231 | HSY | Long | 4/7/1999 | | 0.80 | 5,568.75 | - | (168.75) | (168.75) | -3.03% |
| 47104 | EXDS | Long | 4/23/1999 | | 0.27 | 7,400.00 | - | 800.00 | 800.00 | 10.81% |
| - | HSY | Long | 4/20/1999 | | 0.37 | 5,500.00 | - | (100.00) | (100.00) | -1.82% |
| 88682 | EXDS | Long | 4/26/1999 | | 0.17 | 8,150.00 | - | 50.00 | 50.00 | 0.61% |
| 37751 | EMBU | Long | 4/22/1999 | | 0.30 | 4,150.00 | - | 850.00 | 850.00 | 20.48% |
| 37728 | EMBU | Long | 4/22/1999 | | 0.30 | 8,100.00 | - | 1,900.00 | 1,900.00 | 23.46% |
| 36694 | EXDS | Long | 4/27/1999 | | 0.13 | 5,250.00 | - | (1,150.00) | (1,150.00) | -21.90% |
| 69811 | BEAM | Long | 4/23/1999 | | 0.27 | 16,062.50 | - | 2,937.50 | 2,937.50 | 18.29% |
| 47892 | EBAY | Long | 4/27/1999 | | 0.13 | 10,743.75 | - | (1,743.75) | (1,743.75) | -16.23% |
| | | | | | | 70,925.00 | - | 3,375.00 | 3,375.00 | 4.76% |
| | | | | | | | | | | |
| 86388 | INTC | Long | 5/3/1999 | 5/5/1999 | 0.07 | 31,437.50 | (500.00) | - | (500.00) | -1.59% |
| 80027 | MCK | Long | 5/13/1999 | | 0.63 | 7,475.00 | - | (875.00) | (875.00) | -11.71% |
| 83194 | BEAM | Long | 5/27/1999 | 5/27/1999 | 0.03 | 16,750.00 | 3,250.00 | - | 3,250.00 | 19.40% |
| | | | | | | 55,662.500 | 2,750.00 | (875.000) | 1,875.000 | 3.37% |
| | | | | | | | | | | |
| 26444 | BEAM | Long | 6/2/1999 | | 0.07 | 18,250.00 | 750.00 | - | 750.00 | 4.11% |
| 27475 | EMBU | Long | 6/2/1999 | | 0.97 | 12,050.00 | - | (2,050.00) | (2,050.00) | -17.01% |
| 92731 | EBAY | Long | 6/4/1999 | | 0.90 | 8,115.63 | - | (1,615.63) | (1,615.63) | -19.91% |
| - | UAL | Long | 6/9/1999 | | 0.73 | 6,556.25 | - | 43.75 | 43.75 | 0.67% |
| 46520 | TSEMF | Long | 6/10/1999 | | 0.47 | 2,900.00 | (100.00) | - | (100.00) | -3.45% |
| 46518 | TSEMF | Long | 6/10/1999 | | 0.47 | 712.50 | (12.50) | - | (12.50) | -1.75% |
| 46509 | TSEMF | Long | 6/10/1999 | | 0.47 | 7,125.00 | (125.00) | - | (125.00) | -1.75% |
| 50069 | ANSI | Long | 6/24/1999 | | 0.23 | 8,875.00 | - | 1,026.00 | 1,026.00 | 11.56% |
| 53199 | BEAM | Long | 6/29/1999 | | 0.07 | 20,000.00 | - | (1,000.00) | (1,000.00) | -5.00% |
| 54801 | PBJHA | Long | 6/29/1999 | | 0.07 | 1,500.00 | - | - | - | 0.00% |
| | | | | | | 86,084.38 | 512.50 | (3,595.88) | (3,083.38) | -3.58% |
| | | | | | | | | | | |
| | | | | | | 212,671.88 | 3,262.50 | (1,095.88) | 2,166.63 | 1.02% |

[Print]     [Graph]

Figure 9N-1

GAIN / LOSS REPORT PARAMETERS

Date Range [4/1/1999] to [6/30/1999]   Report Format: [Net Book-ME ▼]

Stock Selection:
- Long Positions ○
- Short Positions ○
- Gain Positions ○    Pick Stocks [ALL ▼]
- Loss Positions ○    Short-Term ○
- Portfolio [AWC ▼]    Long-Term ○    [Proceed]

NET BOOK GAIN / LOSS REPORT
MONTH END
April 1, 1999 through June 30, 2000

| Reference Number | Symbol | Positon | Date Purchase | Date Sold | Months Held | Bought Value | Gross Gains / Loss Realized | Gross Gains / Loss Unrealized | Total | % Gain / Loss |
|---|---|---|---|---|---|---|---|---|---|---|
| 28231 | HSY | Long | 4/7/1999 |  | 0.80 | 5,568.75 | - | (2,289.75) | (2,289.75) | -41.12% |
| 47104 | EXDS | Long | 4/23/1999 |  | 0.27 | 7,400.00 | - | 579.69 | 579.69 | 7.83% |
| - | HSY | Long | 4/20/1999 |  | 0.37 | 5,500.00 | - | (319.69) | (319.69) | -5.81% |
| 88682 | EXDS | Long | 4/26/1999 |  | 0.17 | 8,150.00 | - | (186.81) | (186.81) | -2.29% |
| 37751 | EMBU | Long | 4/22/1999 |  | 0.30 | 4,150.00 | - | 800.00 | 800.00 | 19.28% |
| 37728 | EMBU | Long | 4/22/1999 |  | 0.30 | 8,100.00 | - | 1,747.50 | 1,747.50 | 21.57% |
| 36694 | EXDS | Long | 4/27/1999 |  | 0.13 | 5,250.00 | - | (1,386.68) | (1,386.68) | -26.41% |
| 69811 | BEAM | Long | 4/23/1999 |  | 0.27 | 16,062.50 | - | 2,581.88 | 2,581.88 | 16.07% |
| 47892 | EBAY | Long | 4/27/1999 |  | 0.13 | 10,743.75 | - | (1,941.25) | (1,941.25) | -18.07% |
|  |  |  |  |  |  | 70,925.00 | - | (415.10) | (415.10) | -0.59% |
| 86388 | INTC | Long | 5/3/1999 | 5/5/1999 | 0.07 | 31,437.50 | (706.04) | - | (706.04) | -2.25% |
| 80027 | MCK | Long | 5/13/1999 |  | 0.63 | 7,475.00 | - | (1,036.50) | (1,036.50) | -13.87% |
| 83194 | BEAM | Long | 5/27/1999 | 5/27/1999 | 0.03 | 16,750.00 | 2,444.24 | - | 2,444.24 | 14.59% |
|  |  |  |  |  |  | 55,662.500 | 1,738.20 | (1,036.500) | 701.700 | 1.26% |
| 26444 | BEAM | Long | 6/2/1999 |  | 0.07 | 18,250.00 | 340.38 | - | 340.38 | 1.87% |
| 27475 | EMBU | Long | 6/2/1999 |  | 0.97 | 12,050.00 | - | (2,152.50) | (2,152.50) | -17.86% |
| 92731 | EBAY | Long | 6/4/1999 |  | 0.90 | 8,115.63 | - | (4,404.79) | (4,404.79) | -54.28% |
| - | UAL | Long | 6/9/1999 |  | 0.73 | 6,556.25 | - | (58.75) | (58.75) | -0.90% |
| 46520 | TSEMF | Long | 6/10/1999 |  | 0.47 | 2,900.00 | (137.56) | - | (137.56) | -4.74% |
| 46518 | TSEMF | Long | 6/10/1999 |  | 0.47 | 712.50 | 5.07 | - | 5.07 | 0.71% |
| 46509 | TSEMF | Long | 6/10/1999 |  | 0.47 | 7,125.00 | 30.16 | - | 30.16 | 0.42% |
| 50069 | ANSI | Long | 6/24/1999 |  | 0.23 | 8,875.00 | - | 1,026.00 | 1,026.00 | 11.56% |
| 53199 | BEAM | Long | 6/29/1999 |  | 0.07 | 20,000.00 | - | (7,172.75) | (7,172.75) | -35.86% |
| 54801 | PBJHA | Long | 6/29/1999 |  | 0.07 | 1,500.00 | - | (184.00) | (184.00) | -12.27% |
|  |  |  |  |  |  | 86,084.38 | 238.05 | (12,946.79) | (12,708.74) | -14.76% |
|  |  |  |  |  |  | 212,671.88 | 1,976.25 | (14,398.40) | (12,422.15) | -5.84% |

[Print]   [Graph]

Figure 9N-2

GAIN / LOSS REPORT PARAMETERS

Date Range [4/1/1999] to [6/30/1999]     Report Format: [Gross Book-YTD ▼]

Stock Selection:
- Long Positions ○
- Short Positions ○           Pick Stocks [ALL ▼]
- Gain Positions ○
- Loss Positions ○           Short-Term ○
- Portfolio [AWC ▼]           Long-Term ○    [Proceed]

GROSS BOOK GAIN / LOSS REPORT
YEAR TO DATE
April 1, 1999 through June 30, 1999

| Reference Number | Symbol | Positon | Date Purchase | Date Sold | Months Held | Bought Value | Gross Gains/Loss Realized | Gross Gains/Loss Unrealized | Gross Gains/Loss Total | % Gain/Loss |
|---|---|---|---|---|---|---|---|---|---|---|
| 28231 | HSY | Long | 4/7/1999 | | 91.49 | 5,568.75 | - | (368.75) | (368.75) | -6.62% |
| 47104 | EXDS | Long | 4/23/1999 | 5/13/1999 | 0.67 | 7,400.00 | 1,862.50 | - | 1,862.50 | 25.17% |
| - | HSY | Long | 4/20/1999 | 5/13/1999 | 0.77 | 5,500.00 | 1,000.00 | - | 1,000.00 | 18.18% |
| 88682 | EXDS | Long | 4/26/1999 | 6/23/1999 | 1.93 | 8,150.00 | 1,050.00 | - | 1,050.00 | 12.88% |
| 37751 | EMBU | Long | 4/22/1999 | | 90.99 | 4,150.00 | - | 5,850.00 | 5,850.00 | 140.96% |
| 37728 | EMBU | Long | 4/22/1999 | | 90.99 | 8,100.00 | - | 11,900.00 | 11,900.00 | 146.91% |
| 36694 | EXDS | Long | 4/27/1999 | 6/29/1999 | 2.10 | 5,250.00 | 128.13 | - | 128.13 | 2.44% |
| 69811 | BEAM | Long | 4/23/1999 | 5/27/1999 | 1.13 | 16,062.50 | 2,312.50 | - | 2,312.50 | 14.40% |
| 47892 | EBAY | Long | 4/27/1999 | 6/14/1999 | 1.60 | 10,743.75 | (4,518.75) | - | (4,518.75) | -42.06% |
| | | | | | | 70,925.00 | 1,834.38 | 17,381.25 | 19,215.63 | 27.09% |
| 86388 | INTC | Long | 5/3/1999 | 5/5/1999 | 0.07 | 31,437.50 | (500.00) | - | (500.00) | -1.59% |
| 80027 | MCK | Long | 5/13/1999 | 6/14/1999 | 1.07 | 7,475.00 | (975.00) | - | (975.00) | -13.04% |
| 83194 | BEAM | Long | 5/27/1999 | 5/27/1999 | 0.03 | 16,750.00 | 5,812.50 | - | 5,812.50 | 34.70% |
| | | | | | | 55,662.500 | 4,337.50 | - | 4,337.500 | 7.79% |
| 26444 | BEAM | Long | 6/2/1999 | 6/4/1999 | 0.07 | 18,250.00 | 1,312.50 | - | 1,312.50 | 7.19% |
| 27475 | EMBU | Long | 6/2/1999 | | 89.62 | 12,050.00 | - | 7,950.00 | 7,950.00 | 65.98% |
| 92731 | EBAY | Long | 6/4/1999 | | 89.56 | 8,115.63 | - | (1,890.63) | (1,890.63) | -23.30% |
| - | UAL | Long | 6/9/1999 | | 89.39 | 6,556.25 | - | (156.25) | (156.25) | -2.38% |
| 46520 | TSEMF | Long | 6/10/1999 | 6/24/1999 | 0.47 | 2,900.00 | 75.00 | - | 75.00 | 2.59% |
| 46518 | TSEMF | Long | 6/10/1999 | 6/24/1999 | 0.47 | 712.50 | 31.25 | - | 31.25 | 4.39% |
| 46509 | TSEMF | Long | 6/10/1999 | 6/24/1999 | 0.47 | 7,125.00 | 312.50 | - | 312.50 | 4.39% |
| 50069 | ANSI | Long | 6/24/1999 | | 88.89 | 8,875.00 | - | 2,500.00 | 2,500.00 | 28.17% |
| 53199 | BEAM | Long | 6/29/1999 | | 88.72 | 20,000.00 | - | (687.50) | (687.50) | -3.44% |
| 54801 | PBJHA | Long | 6/29/1999 | | 88.72 | 1,500.00 | - | - | - | 0.00% |
| | | | | | | 86,084.38 | 1,731.25 | 7,715.63 | 9,446.88 | 10.97% |
| | | | | | | 212,671.88 | 7,903.13 | 25,096.88 | 33,000.00 | 15.52% |

[Print]    [Graph]

Figure 9N-3

GAIN / LOSS REPORT PARAMETERS

Date Range [4/1/1999] to [6/30/1999]    Report Format: [Net Book-YTD ▼]

Stock Selection:
- Long Positions  ○
- Short Positions  ○
- Gain Positions  ○
- Loss Positions  ○
- Portfolio  [AWC ▼]

Pick Stocks  [ALL ▼]

Short-Term  ○
Long-Term  ○    [Proceed]

NET BOOK GAIN / LOSS REPORT
YEAR TO DATE
April 1, 1999 through June 30, 1999

| Reference Number | Symbol | Positon | Date Purchase | Date Sold | Months Held | Bought Value | Gross Gains / Loss Realized | Gross Gains / Loss Unrealized | Gross Gains / Loss Total | % Gain / Loss |
|---|---|---|---|---|---|---|---|---|---|---|
| 28231 | HSY | Long | 4/7/1999 | 1/0/1900 | 91.49 | 5,568.75 | - | (2,489.76) | (2,489.76) | -44.71% |
| 47104 | EXDS | Long | 4/23/1999 | 5/13/1999 | 0.67 | 7,400.00 | 1,642.19 | - | 1,642.19 | 22.19% |
| - | HSY | Long | 4/20/1999 | 5/13/1999 | 0.77 | 5,500.00 | 780.32 | - | 780.32 | 14.19% |
| 88682 | EXDS | Long | 4/26/1999 | 6/23/1999 | 1.93 | 8,150.00 | 813.19 | - | 813.19 | 9.98% |
| 37751 | EMBU | Long | 4/22/1999 | | 90.99 | 4,150.00 | - | 5,800.00 | 5,800.00 | 139.76% |
| 37728 | EMBU | Long | 4/22/1999 | | 90.99 | 8,100.00 | - | 11,747.50 | 11,747.50 | 145.03% |
| 36694 | EXDS | Long | 4/27/1999 | 6/29/1999 | 2.10 | 5,250.00 | (108.56) | - | (108.56) | -2.07% |
| 69811 | BEAM | Long | 4/23/1999 | 5/27/1999 | 1.13 | 16,062.50 | 1,956.88 | - | 1,956.88 | 12.18% |
| 47892 | EBAY | Long | 4/27/1999 | 6/14/1999 | 1.60 | 10,743.75 | (4,716.25) | - | (4,716.25) | -43.90% |
| | | | | | | 70,925.00 | 367.77 | 15,057.74 | 15,425.51 | 21.75% |
| 86388 | INTC | Long | 5/3/1999 | 5/5/1999 | 0.07 | 31,437.50 | (706.04) | - | (706.04) | -2.25% |
| 80027 | MCK | Long | 5/13/1999 | 6/14/1999 | 1.07 | 7,475.00 | (1,136.50) | - | (1,136.50) | -15.20% |
| 83194 | BEAM | Long | 5/27/1999 | 5/27/1999 | 0.03 | 16,750.00 | 5,006.74 | - | 5,006.74 | 29.89% |
| | | | | | | 55,662.500 | 3,164.20 | - | 3,164.200 | 5.68% |
| 26444 | BEAM | Long | 6/2/1999 | 6/4/1999 | 0.07 | 18,250.00 | 902.88 | - | 902.88 | 4.95% |
| 27475 | EMBU | Long | 6/2/1999 | | 89.62 | 12,050.00 | - | 7,847.50 | 7,847.50 | 65.12% |
| 92731 | EBAY | Long | 6/4/1999 | 1/0/1900 | 89.56 | 8,115.63 | - | (4,679.80) | (4,679.80) | -57.66% |
| - | UAL | Long | 6/9/1999 | 1/0/1900 | 89.39 | 6,556.25 | - | (258.75) | (258.75) | -3.95% |
| 46520 | TSEMF | Long | 6/10/1999 | 6/24/1999 | 0.47 | 2,900.00 | 37.44 | - | 37.44 | 1.29% |
| 46518 | TSEMF | Long | 6/10/1999 | 6/24/1999 | 0.47 | 712.50 | 13.68 | - | 13.68 | 1.92% |
| 46509 | TSEMF | Long | 6/10/1999 | 6/24/1999 | 0.47 | 7,125.00 | 157.34 | - | 157.34 | 2.21% |
| 50069 | ANSI | Long | 6/24/1999 | | 88.89 | 8,875.00 | - | 2,401.00 | 2,401.00 | 27.05% |
| 53199 | BEAM | Long | 6/29/1999 | | 88.72 | 20,000.00 | - | (6,860.27) | (6,860.27) | -34.30% |
| 54801 | PBJHA | Long | 6/29/1999 | | 88.72 | 1,500.00 | - | (184.00) | (184.00) | -12.27% |
| | | | | | | 86,084.38 | 1,111.34 | (1,734.32) | (622.98) | -0.72% |
| | | | | | | 212,671.88 | 4,643.31 | 13,323.43 | 17,966.74 | 8.45% |

[Print]    [Graph]

Figure 9N-4

RETURN ON GROSS SECURITIES REPORT PARAMETERS

Date Range [4/1/1999] to [6/30/1999]     Report Format: [Gross Book-ME ▼]

Stock Selection:
- Long Positions  ◯
- Short Positions ◯
- Gain Positions  ◯     Pick Stocks [ALL ▼]
- Loss Positions  ◯     Short-Term Positions ◯
- Portfolio [AWC ▼]     Long-Term Positions ◯   [Proceed]

RETURN ON GROSS SECURITIES REPORT
MONTH END
April 1, 1999 through June 30, 1999

| Reference Number | Symbol | Positon | Date Purchase | Date Sold | Months Held | Gross Gain / Loss | Return on Investment Percentage Increase | Monthly Return | Annualized Return |
|---|---|---|---|---|---|---|---|---|---|
| 28231 | HSY | Long | 4/7/1999 | | 0.80 | (168.75) | -3.13% | -3.91% | -46.88% |
| 47104 | EXDS | Long | 4/23/1999 | | 0.27 | 800.00 | 9.76% | 36.59% | 439.02% |
| - | HSY | Long | 4/20/1999 | | 0.37 | (100.00) | -1.85% | -5.05% | -60.61% |
| 88682 | EXDS | Long | 4/26/1999 | | 0.17 | 50.00 | 0.61% | 3.66% | 43.90% |
| 37751 | EMBU | Long | 4/22/1999 | | 0.30 | 850.00 | 17.00% | 56.67% | 680.00% |
| 37728 | EMBU | Long | 4/22/1999 | | 0.30 | 1,900.00 | 19.00% | 63.33% | 760.00% |
| 36694 | EXDS | Long | 4/27/1999 | | 0.13 | (1,150.00) | -28.05% | -210.37% | -2524.39% |
| 69811 | BEAM | Long | 4/23/1999 | | 0.27 | 2,937.50 | 15.46% | 57.98% | 695.72% |
| 47892 | EBAY | Long | 4/27/1999 | | 0.13 | (1,743.75) | -19.38% | -145.31% | -1743.75% |
| | | | | | | 3,375.00 | 4.54% | 15.98% | 191.72% |
| 86388 | INTC | Long | 5/3/1999 | 5/5/1999 | 0.07 | (500.00) | -1.62% | -24.24% | -290.91% |
| 80027 | MCK | Long | 5/13/1999 | | 0.63 | (875.00) | -13.26% | -20.93% | -251.20% |
| 83194 | BEAM | Long | 5/27/1999 | 5/27/1999 | 0.03 | 3,250.00 | 16.25% | 487.50% | 5850.00% |
| | | | | | | 1,875.000 | 3.26% | 27.18% | 326.13% |
| 26444 | BEAM | Long | 6/2/1999 | | 0.07 | 750.00 | 3.95% | 59.21% | 710.53% |
| 27475 | EMBU | Long | 6/2/1999 | | 0.97 | (2,050.00) | -20.50% | -21.21% | -254.48% |
| 92731 | EBAY | Long | 6/4/1999 | | 0.90 | (1,615.63) | -24.86% | -27.62% | -331.41% |
| - | UAL | Long | 6/9/1999 | | 0.73 | 43.75 | 0.66% | 0.90% | 10.85% |
| 46520 | TSEMF | Long | 6/10/1999 | | 0.47 | (100.00) | -3.57% | -7.65% | -91.84% |
| 46518 | TSEMF | Long | 6/10/1999 | | 0.47 | (12.50) | -1.79% | -3.83% | -45.92% |
| 46509 | TSEMF | Long | 6/10/1999 | | 0.47 | (125.00) | -1.79% | -3.83% | -45.92% |
| 50069 | ANSI | Long | 6/24/1999 | | 0.23 | 1,026.00 | 10.26% | 43.97% | 527.66% |
| 53199 | BEAM | Long | 6/29/1999 | | 0.07 | (1,000.00) | -5.26% | -78.95% | -947.37% |
| 54801 | PBJHA | Long | 6/29/1999 | | 0.07 | - | 0.00% | 0.00% | 0.00% |
| | | | | | | (3,083.38) | -3.71% | -10.67% | -128.09% |

[Print]  [Graph]

Figure 9O-1

GROSS RETURN ON SECURITIES REPORT PARAMETERS

Date Range: 4/1/1999 to 6/30/1999         Report Format: Gross Book-YTD

Stock Selection:
- Long Positions  ○
- Short Positions ○          Pick Stocks: ALL
- Gain Positions  ○
- Loss Positions  ○          Short-Term Positions ○
- Portfolio: AWC             Long-Term Positions  ○   [Proceed]

GROSS RETURN ON SECURITIES REPORT
YEAR TO DATE
April 1, 1999 through June 30, 1999

| Reference Number | Symbol | Positon | Date Purchase | Date Sold | Months Held | Gross Gain / Loss | Percentage Increase | Monthly Return | Annualized Return |
|---|---|---|---|---|---|---|---|---|---|
| 28231 | HSY | Long | 4/7/1999 | | 91.49 | (368.75) | -6.62% | -0.07% | -0.87% |
| 47104 | EXDS | Long | 4/23/1999 | 5/13/1999 | 0.67 | 1,862.50 | 25.17% | 37.75% | 453.04% |
| - | HSY | Long | 4/20/1999 | 5/13/1999 | 0.77 | 1,000.00 | 18.18% | 23.72% | 284.58% |
| 88682 | EXDS | Long | 4/26/1999 | 6/23/1999 | 1.93 | 1,050.00 | 12.88% | 6.66% | 79.97% |
| 37751 | EMBU | Long | 4/22/1999 | | 90.99 | 5,850.00 | 140.96% | 1.55% | 18.59% |
| 37728 | EMBU | Long | 4/22/1999 | | 90.99 | 11,900.00 | 146.91% | 1.61% | 19.38% |
| 36694 | EXDS | Long | 4/27/1999 | 6/29/1999 | 2.10 | 128.13 | 2.44% | 1.16% | 13.95% |
| 69811 | BEAM | Long | 4/23/1999 | 5/27/1999 | 1.13 | 2,312.50 | 14.40% | 12.70% | 152.44% |
| 47892 | EBAY | Long | 4/27/1999 | 6/14/1999 | 1.60 | (4,518.75) | -42.06% | -26.29% | -315.45% |
| | | | | | | 19,215.63 | 27.09% | 1.13% | 13.60% |
| | | | | | | | | | |
| 86388 | INTC | Long | 5/3/1999 | 5/5/1999 | 0.07 | (500.00) | -1.59% | -23.86% | -286.28% |
| 80027 | MCK | Long | 5/13/1999 | 6/14/1999 | 1.07 | (975.00) | -13.04% | -12.23% | -146.74% |
| 83194 | BEAM | Long | 5/27/1999 | 5/27/1999 | 0.03 | 5,812.50 | 34.70% | 1041.04% | 12492.54% |
| | | | | | | 4,337.50 | 18.61% | 1.38% | 16.57% |
| | | | | | | | | | |
| 26444 | BEAM | Long | 6/2/1999 | 6/4/1999 | 0.07 | 1,312.50 | 7.19% | 107.88% | 1294.52% |
| 27475 | EMBU | Long | 6/2/1999 | | 89.62 | 7,950.00 | 65.98% | 0.74% | 8.83% |
| 92731 | EBAY | Long | 6/4/1999 | | 89.56 | (1,890.63) | -23.30% | -0.26% | -3.12% |
| - | UAL | Long | 6/9/1999 | | 89.39 | (156.25) | -2.38% | -0.03% | -0.32% |
| 46520 | TSEMF | Long | 6/10/1999 | 6/24/1999 | 0.47 | 75.00 | 2.59% | 5.54% | 66.50% |
| 46518 | TSEMF | Long | 6/10/1999 | 6/24/1999 | 0.47 | 31.25 | 4.39% | 9.40% | 112.78% |
| 46509 | TSEMF | Long | 6/10/1999 | 6/24/1999 | 0.47 | 312.50 | 4.39% | 9.40% | 112.78% |
| 50069 | ANSI | Long | 6/24/1999 | | 88.89 | 2,500.00 | 28.17% | 0.32% | 3.80% |
| 53199 | BEAM | Long | 6/29/1999 | | 88.72 | (687.50) | -3.44% | -0.04% | -0.46% |
| 54801 | PBJHA | Long | 6/29/1999 | | 88.72 | - | 0.00% | 0.00% | 0.00% |
| | | | | | | 9,446.88 | 15.52% | 0.49% | 5.83% |

[Print]   [Graph]

Figure 9O-2

NET CASH RETURN ON SECURITIES REPORT PARAMETERS

Date Range [4/1/1999] to [6/30/1999]   Report Format: [Net Cash-ME ▼]

Stock Selection:
- Long Positions ○
- Short Positions ○
- Gain Positions ○
- Loss Positions ○
- Portfolio [AWC ▼]

Pick Stocks [ALL ▼]

Short-Term Positions ○
Long-Term Positions ○    [Proceed]

NET CASH RETURN ON SECURITIES REPORT
MONTH END
April 1, 1999 through June 30, 1999

| Reference Number | Symbol | Positon | Date Purchase | Date Sold | Months Held | Gross Gain / Loss | Return on Investment Percentage Increase | Monthly Return | Annualized Return |
|---|---|---|---|---|---|---|---|---|---|
| 28231 | HSY | Long | 4/7/1999 | | 0.80 | (2,489.75) | -108.78% | -135.97% | -1631.65% |
| 47104 | EXDS | Long | 4/23/1999 | | 0.27 | 1,642.19 | 48.28% | 181.05% | 2172.63% |
| - | HSY | Long | 4/20/1999 | | 0.37 | 780.32 | -28.10% | -76.64% | -919.71% |
| 88682 | EXDS | Long | 4/26/1999 | | 0.17 | 813.19 | -13.58% | -81.49% | -977.91% |
| 37751 | EMBU | Long | 4/22/1999 | | 0.30 | 5,800.00 | 63.49% | 211.64% | 2539.68% |
| 37728 | EMBU | Long | 4/22/1999 | | 0.30 | 11,747.50 | 70.58% | 235.28% | 2823.39% |
| 36694 | EXDS | Long | 4/27/1999 | | 0.13 | (108.56) | -194.30% | -1457.28% | -17487.32% |
| 69811 | BEAM | Long | 4/23/1999 | | 0.27 | 1,956.88 | 59.53% | 223.23% | 2678.71% |
| 47892 | EBAY | Long | 4/27/1999 | | 0.13 | (4,716.25) | -249.04% | -1867.78% | -22413.41% |
| | | | | | | 15,425.52 | -2.70% | -9.49% | -113.88% |
| 86388 | INTC | Long | 5/3/1999 | 5/5/1999 | 0.07 | (706.04) | -69.40% | -1040.93% | -12491.13% |
| 80027 | MCK | Long | 5/13/1999 | | 0.63 | (1,136.50) | -36.94% | -58.33% | -700.00% |
| 83194 | BEAM | Long | 5/27/1999 | 5/27/1999 | 0.03 | 5,006.74 | 841.67% | 25250.13% | 303001.59% |
| | | | | | | 3,164.20 | 17.06% | 142.27% | 1707.24% |
| 26444 | BEAM | Long | 6/2/1999 | 6/4/1999 | 0.07 | 902.88 | 97.23% | 1458.42% | 17501.09% |
| 27475 | EMBU | Long | 6/2/1999 | | 0.97 | 7,847.50 | -18.32% | -18.96% | -227.46% |
| 92731 | EBAY | Long | 6/4/1999 | | 0.90 | (4,679.80) | -116.03% | -128.92% | -1547.04% |
| - | UAL | Long | 6/9/1999 | | 0.73 | (258.75) | -1.20% | -1.64% | -19.69% |
| 46520 | TSEMF | Long | 6/10/1999 | 6/24/1999 | 0.47 | 37.44 | -141.01% | -302.16% | -3625.90% |
| 46518 | TSEMF | Long | 6/10/1999 | 6/24/1999 | 0.47 | 13.68 | 21.15% | 45.32% | 543.84% |
| 46509 | TSEMF | Long | 6/10/1999 | 6/24/1999 | 0.47 | 157.34 | 12.56% | 26.92% | 323.03% |
| 50069 | ANSI | Long | 6/24/1999 | | 0.23 | 2,401.00 | 49.00% | 209.99% | 2519.93% |
| 53199 | BEAM | Long | 6/29/1999 | | 0.07 | (6,860.26) | -962.01% | -14430.19% | -173162.24% |
| 54801 | PBJHA | Long | 6/29/1999 | | 0.07 | (184.00) | -163.90% | -2458.43% | -29501.19% |
| | | | | | | (622.97) | -52.75% | -151.77% | -1821.22% |

[Print]  [Graph]

Figure 9P-1

NET CASH RETURN ON SECURITIES REPORT PARAMETERS

Date Range [4/1/1999] to [6/30/1999]     Report Format: [Net Cash-YTD ▼]

Stock Selection:
- Long Positions  ○
- Short Positions ○                      Pick Stocks  [ALL ▼]
- Gain Positions  ○
- Loss Positions  ○                      Short-Term Positions  ○
- Portfolio [AWC ▼]                      Long-Term Positions   ○   [Proceed]

NET CASH RETURN ON SECURITIES REPORT
YEAR TO DATE
April 1, 1999 through June 30, 1999

| Reference Number | Symbol | Position | Date Purchase | Date Sold | Months Held | Gross Gain / Loss | Return on Investment Percentage Increase | Monthly Return | Annualized Return |
|---|---|---|---|---|---|---|---|---|---|
| 28231 | HSY | Long | 4/7/1999 | | 91.49 | (2,489.76) | -118.28% | -1.29% | -15.51% |
| 47104 | EXDS | Long | 4/23/1999 | 5/13/1999 | 0.67 | 1,642.19 | 136.77% | 205.16% | 2461.92% |
| - | HSY | Long | 4/20/1999 | 5/13/1999 | 0.77 | 780.32 | 68.59% | 89.47% | 1073.65% |
| 88682 | EXDS | Long | 4/26/1999 | 6/23/1999 | 1.93 | 813.19 | 59.12% | 30.58% | 366.97% |
| 37751 | EMBU | Long | 4/22/1999 | | 90.99 | 5,800.00 | 460.32% | 5.06% | 60.71% |
| 37728 | EMBU | Long | 4/22/1999 | | 90.99 | 11,747.50 | 474.50% | 5.21% | 62.58% |
| 36694 | EXDS | Long | 4/27/1999 | 6/29/1999 | 2.10 | (108.56) | -15.21% | -7.24% | -86.92% |
| 69811 | BEAM | Long | 4/23/1999 | 5/27/1999 | 1.13 | 1,956.88 | 45.12% | 39.81% | 477.71% |
| 47892 | EBAY | Long | 4/27/1999 | 6/14/1999 | 1.60 | (4,716.25) | -605.04% | -378.15% | -4537.76% |
| | | | | | | 15,425.51 | 100.26% | 4.19% | 50.33% |
| 86388 | INTC | Long | 5/3/1999 | 5/5/1999 | 0.07 | (706.04) | -69.40% | -1040.93% | -12491.13% |
| 80027 | MCK | Long | 5/13/1999 | 6/14/1999 | 1.07 | (1,136.50) | -40.51% | -37.98% | -455.72% |
| 83194 | BEAM | Long | 5/27/1999 | 5/27/1999 | 0.03 | 5,006.74 | 1724.06% | 51721.95% | 620663.35% |
| | | | | | | 3,164.20 | 29.95% | 2.22% | 26.67% |
| 26444 | BEAM | Long | 6/2/1999 | 6/4/1999 | 0.07 | 902.88 | 257.90% | 3868.56% | 46422.78% |
| 27475 | EMBU | Long | 6/2/1999 | | 89.62 | 7,847.50 | 66.80% | 0.75% | 8.94% |
| 92731 | EBAY | Long | 6/4/1999 | | 89.56 | (4,679.80) | -123.27% | -1.38% | -16.52% |
| - | UAL | Long | 6/9/1999 | | 89.39 | (258.75) | -5.30% | -0.06% | -0.71% |
| 46520 | TSEMF | Long | 6/10/1999 | 6/24/1999 | 0.47 | 37.44 | 38.38% | 82.24% | 986.87% |
| 46518 | TSEMF | Long | 6/10/1999 | 6/24/1999 | 0.47 | 13.68 | 57.07% | 122.28% | 1467.41% |
| 46509 | TSEMF | Long | 6/10/1999 | 6/24/1999 | 0.47 | 157.34 | 65.53% | 140.43% | 1685.18% |
| 50069 | ANSI | Long | 6/24/1999 | | 88.89 | 2,401.00 | 114.66% | 1.29% | 15.48% |
| 53199 | BEAM | Long | 6/29/1999 | | 88.72 | (6,860.27) | -920.10% | -10.37% | -124.45% |
| 54801 | PBJHA | Long | 6/29/1999 | | 88.72 | (184.00) | -163.90% | -1.85% | -22.17% |
| | | | | | | (622.98) | 17.90% | 0.56% | 6.72% |

[Print]   [Graph]

Figure 9P-2

IRS SCHEDULE D (FORM 1040) PARAMETERS

Date Range  4/1/1999  to  6/30/1999

Pick Stocks  HSY ▼

Short-Term Positions  ⊗

Long-Term Positions  ○

Portfolio:  AWC ▼

[Proceed]

---

IRS SCHEDULE D (FORM 1040)-SHORT TERM
April 1, 1999 through June 30, 1999

| Symbol | Shares | Date Acquired | Date Sold | Sales Price | Cost or Other Basis | Gain or Loss |
|---|---|---|---|---|---|---|
| EMBU | 100 | 4/22/1999 | 5/13/1999 | 9,262.50 | 7,620.31 | 1,642.19 |
| EMBU | 100 | 4/22/1999 | 5/13/1999 | 6,500.00 | 5,719.69 | 780.32 |
| EXDS | 100 | 4/27/1999 | 6/23/1999 | 9,200.00 | 8,386.81 | 813.19 |
|  |  |  |  | 24,962.50 | 21,726.81 | 3,235.70 |

[Print]  [Graph]

Figure 9Q

TAX EXPENSE REPORT PARAMETERS

Date Range: 4/1/1999 to 6/30/1999

Stock Selection:
- Long Positions
- Short Positions
- Gain Positions
- Loss Positions
- Portfolio    AWC ▼      Pick Stocks  ALL ▼
                                Short-Term  ○
                                Long-Term   ○          [Proceed]

[Print]  [Graph]

TAX EXPENSE REPORT
YEAR TO DATE
April 1, 1999 through June 30, 1999

| Reference Number | Symbol | Short-Term Gains/Losses Realized | Short-Term Gains/Losses Unrealized | State Taxes Realized 10.00% | State Taxes Unrealized 10.00% | Federal Taxes Realized 40.00% | Federal Taxes Unrealized 40.00% | Long-Term Gains/Losses Realized | Long-Term Gains/Losses Unrealized | State Taxes Realized 8.00% | State Taxes Unrealized 8.00% | Federal Taxes Realized 20.00% | Federal Taxes Unrealized 20.00% | Total Tax Expense |
|---|---|---|---|---|---|---|---|---|---|---|---|---|---|---|
| 28231 | HSY | - | - | - | - | - | - | - | - | - | - | - | - | - |
| 47104 | EXDS | - | - | - | - | - | - | 1,642.19 | (2,489.76) | 131.38 | (199.18) | 328.44 | (497.95) | (697.13) |
|  | HSY | - | - | - | - | - | - | 780.32 | - | 62.43 | - | 156.06 | - | 459.81 |
| 86682 | EXDS | - | - | - | - | - | - | 813.19 | - | 65.06 | - | 162.64 | - | 218.49 |
| 37751 | EMBU | - | - | - | - | - | - | - | - | - | - | - | - | 227.69 |
| 37728 | EMBU | - | - | - | - | - | - | - | 5,800.00 | - | 464.00 | - | 1,160.00 | 1,624.00 |
| 36694 | EXDS | - | - | - | - | - | - | - | 11,747.50 | - | 939.80 | - | 2,349.50 | 3,289.30 |
| 69811 | BEAM | - | - | - | - | - | - | (108.56) | - | (8.68) | - | (21.71) | - | (30.40) |
| 47892 | EBAY | - | - | - | - | - | - | 1,956.88 | - | 156.55 | - | 391.38 | - | 547.93 |
|  |  | - | - | - | - | - | - | (4,716.25) | - | (377.30) | - | (943.25) | - | (1,320.55) |
|  |  |  |  |  |  |  |  | 367.77 | 15,057.74 | 29.42 | 1,204.62 | 73.55 | 3,011.55 | 4,319.14 |
| 86388 | INTC | - | - | - | - | - | - | (706.04) | - | (56.48) | - | (141.21) | - | (197.69) |
| 80027 | MCK | - | - | - | - | - | - | (1,136.50) | - | (90.92) | - | (227.30) | - | (318.22) |
| 83194 | BEAM | - | - | - | - | - | - | 5,006.74 | - | 400.54 | - | 1,001.35 | - | 1,401.89 |
|  |  |  |  |  |  |  |  | 3,164.20 |  | 253.14 |  | 632.84 |  | 885.98 |
| 26444 | BEAM | - | - | - | - | - | - | 902.88 | - | 72.23 | - | 180.58 | - | 252.81 |
| 27475 | EMBU | - | - | - | - | - | - | - | 7,847.50 | - | 1,255.60 | - | 1,569.50 | 2,825.10 |
| 92731 | EBAY | - | - | - | - | - | - | - | (4,679.81) | - | - | - | (935.96) | (935.96) |
|  | UAL | - | - | - | - | - | - | - | (258.75) | - | - | - | (51.75) | (51.75) |
| 46520 | TSEMF | - | - | - | - | - | - | 37.44 | - | 3.00 | - | 7.49 | - | 10.48 |
| 46518 | TSEMF | - | - | - | - | - | - | 13.68 | - | 1.09 | - | 2.74 | - | 3.83 |
| 46509 | TSEMF | - | - | - | - | - | - | 157.34 | - | 12.59 | - | 31.47 | - | 44.06 |
| 50069 | ANSI | - | - | - | - | - | - | - | 2,401.00 | - | 384.16 | - | 480.20 | 864.36 |
| 53199 | BEAM | - | - | - | - | - | - | - | (6,860.29) | - | - | - | (1,372.06) | (1,372.06) |
| 54801 | PBJHA | - | - | - | - | - | - | - | (184.00) | - | - | - | (36.80) | (36.80) |
|  |  |  |  |  |  |  |  | 1,111.34 | (1,734.35) | 88.91 | 1,639.76 | 222.27 | (346.87) | 1,604.06 |
|  |  |  |  |  |  |  |  | 4,643.31 | 13,323.38 | 371.46 | 2,844.38 | 928.66 | 2,664.68 | 6,809.18 |

Figure 9R

TAXES PAYABLES REPORT PARAMETERS

| Date Range | 4/1/1999 | to | 6/30/1999 | |
|---|---|---|---|---|
| Stock Selection: | | | | |
| Long Positions | ○ | | | |
| Short Positions | ○ | | Pick Stocks | |
| Gain Positions | ○ | | | |
| Loss Positions | ○ | | | |
| Portfolio | AWC ▼ | | Short-Term ○ | |
| | | | Long-Term ○ | |
| | | | | Proceed ▶ |

TAXES PAYABLE REPORT
YEAR TO DATE
April 1, 1999 through June 30, 1999

| Reference Number | Symbol | Short-Term Gains/Losses Realized | Short-Term Gains/Losses Unrealized | State Taxes Realized 10.00% | State Taxes Unrealized 10.00% | Federal Taxes Realized 40.00% | Federal Taxes Unrealized 40.00% | Long-Term Gains/Losses Realized | Long-Term Gains/Losses Unrealized | State Taxes Realized 8.00% | State Taxes Unrealized 8.00% | Federal Taxes Realized 20.00% | Federal Taxes Unrealized 20.00% | Gross Taxs Payble | Taxes Paid Date | Taxes Paid Amount | Net Taxs Payble |
|---|---|---|---|---|---|---|---|---|---|---|---|---|---|---|---|---|---|
| 28231 | HSY | - | - | - | - | - | - | - | (2,489.76) | - | (199.18) | - | (497.95) | (697.13) | 6/13/1999 | 400.00 | (1,097.13) |
| 47104 | EXDS | - | - | - | - | - | - | 1,642.19 | - | 131.38 | - | 328.44 | - | 459.81 | 6/15/1999 | 1,000.00 | (540.19) |
| - | HSY | - | - | - | - | - | - | 780.32 | - | 62.43 | - | 156.06 | - | 218.49 | | | 218.49 |
| 88682 | EXDS | - | - | - | - | - | - | 813.19 | - | 65.06 | - | 162.64 | - | 227.69 | | | 227.69 |
| 37751 | EMBU | - | - | - | - | - | - | - | 5,800.00 | - | 464.00 | - | 1,160.00 | 1,624.00 | | | 1,624.00 |
| 37728 | EMBU | - | - | - | - | - | - | - | 11,747.50 | - | 939.80 | - | 2,349.50 | 3,289.30 | | | 3,289.30 |
| 36694 | EXDS | - | - | - | - | - | - | (108.55) | - | (8.68) | - | (21.71) | - | (30.40) | | | (30.40) |
| 69811 | BEAM | - | - | - | - | - | - | 1,956.88 | - | 156.55 | - | 391.38 | - | 547.93 | | | 547.93 |
| 47992 | EBAY | - | - | - | - | - | - | (4,716.25) | - | (377.30) | - | (943.25) | - | (1,320.55) | | | (1,320.55) |
| | | - | - | - | - | - | - | 357.77 | 15,057.74 | 29.42 | 1,204.62 | 73.55 | 3,011.55 | 4,319.14 | | 1,400.00 | 2,919.14 |
| 86368 | INTC | - | - | - | - | - | - | (706.04) | - | (56.48) | - | (141.21) | - | (197.69) | | | (197.69) |
| 80027 | MCK | - | - | - | - | - | - | (1,136.50) | - | (90.92) | - | (227.30) | - | (318.22) | | | (318.22) |
| 83194 | BEAM | - | - | - | - | - | - | 5,006.74 | - | 400.54 | - | 1,001.35 | - | 1,401.89 | | | 1,401.89 |
| | | - | - | - | - | - | - | 3,164.20 | - | 253.14 | - | 632.84 | - | 885.98 | | | 885.98 |
| 26444 | BEAM | - | - | - | - | - | - | 902.88 | - | 72.23 | - | 180.58 | - | 252.81 | | | 252.81 |
| 27475 | EMBU | - | - | - | - | - | - | - | 7,847.50 | - | 1,255.60 | - | 1,569.50 | 2,825.10 | | | 2,825.10 |
| 92731 | EBAY | - | - | - | - | - | - | - | (4,679.81) | - | - | - | (935.96) | (935.96) | | | (935.96) |
| - | UAL | - | - | - | - | - | - | - | (258.75) | - | - | - | (51.75) | (51.75) | | | (51.75) |
| 46520 | TSEMF | - | - | - | - | - | - | 37.44 | - | 3.00 | - | 7.49 | - | 10.48 | | | 10.48 |
| 46518 | TSEMF | - | - | - | - | - | - | 13.68 | - | 1.09 | - | 2.74 | - | 3.83 | | | 3.83 |
| 46509 | TSEMF | - | - | - | - | - | - | 157.34 | - | 12.59 | - | 31.47 | - | 44.06 | | | 44.06 |
| 50069 | ANSI | - | - | - | - | - | - | - | 2,401.00 | - | 384.16 | - | 480.20 | 864.36 | | | 864.36 |
| 53199 | BEAM | - | - | - | - | - | - | - | (6,860.29) | - | - | - | (1,372.06) | (1,372.06) | | | (1,372.06) |
| 54801 | PBJHA | - | - | - | - | - | - | - | (184.00) | - | - | - | (36.80) | (36.80) | | | (36.80) |
| | | - | - | - | - | - | - | 1,111.34 | (1,734.35) | 88.91 | 1,639.76 | 222.27 | 2,664.68 | 1,604.06 | | | 1,604.06 |
| Gross Taxes Payable | | | | | | | | | | 371.46 | 2,844.38 | 928.66 | 2,664.68 | 6,809.18 | | | 5,409.18 |
| Taxes Paid | | | | | | | | | | | | | | | | 1,400.00 | |
| Net Taxes Payble | | | | | | | | | | 371.46 | 2,844.38 | 928.66 | 2,664.68 | | | | |

[Print] [Graph]

Figure 9S

| CASH NET PROCEEDS REPORT PARAMETERS | | | | | | |
|---|---|---|---|---|---|---|
| Date Range | 4/1/1999 | to | 6/30/1999 | | Report Format: | Net Cash-YTD |
| Stock Selection: | | | | | | |
| Long Positions | ○ | | | | | |
| Short Positions | ○ | | | | Pick Stocks | ALL |
| Gain Positions | ○ | | | | | |
| Loss Positions | ○ | | | | Short-Term Positions | ○ |
| Portfolio | AWC | | | | Long-Term Positions | ○ |

Proceed

CASH NET PROCEEDS REPORT
YEAR TO DATE
April 1, 1999 through June 30, 1999

| Reference Number | Symbol | Positon | Date Sold | Net Gain/Loss | Unrealized Gains/Losses | Realized Gains/Losses | Commissions and Costs | Margin Interest | Net Proceeds b/f Taxes | Reserve for Taxes | Net Proceeds after Taxes |
|---|---|---|---|---|---|---|---|---|---|---|---|
| 28231 | HSY | Long | | (368.75) | (368.75) | - | 62.50 | 2,058.52 | - | - | - |
| 47104 | EXDS | Long | 5/13/1999 | 1,862.50 | - | 1,862.50 | 205.31 | 15.00 | 1,642.19 | 459.81 | 1,182.38 |
| - | HSY | Long | 5/13/1999 | 1,000.00 | - | 1,000.00 | 205.31 | 14.38 | 780.32 | 218.49 | 561.83 |
| 88682 | EXDS | Long | 6/23/1999 | 1,050.00 | - | 1,050.00 | 236.81 | | 813.19 | 227.69 | 585.50 |
| 37751 | EMBU | Long | | 5,850.00 | 5,850.00 | - | 50.00 | - | - | - | - |
| 37728 | EMBU | Long | | 11,900.00 | 11,900.00 | - | 152.50 | - | - | - | - |
| 36694 | EXDS | Long | 6/29/1999 | 128.13 | - | 128.13 | 236.68 | - | (108.56) | (30.40) | (78.16) |
| 69811 | BEAM | Long | 5/27/1999 | 2,312.50 | - | 2,312.50 | 355.62 | - | 1,956.88 | 547.93 | 1,408.95 |
| 47892 | EBAY | Long | 6/14/1999 | (4,518.75) | - | (4,518.75) | 137.50 | 60.00 | (4,716.25) | (1,320.55) | (3,395.70) |
| | | | | 19,215.63 | 17,381.25 | 1,834.38 | 1,642.23 | 2,147.89 | 367.77 | 102.98 | 264.79 |
| | | | | | | | | | | | |
| 86388 | INTC | Long | 5/5/1999 | (500.00) | - | (500.00) | 206.04 | - | (706.04) | (197.69) | (508.35) |
| 80027 | MCK | Long | 6/14/1999 | (975.00) | - | (975.00) | 137.50 | 24.00 | (1,136.50) | (318.22) | (818.28) |
| 83194 | BEAM | Long | 5/27/1999 | 5,812.50 | - | 5,812.50 | 805.76 | - | 5,006.74 | 1,401.89 | 3,604.85 |
| | | | | 4,337.50 | - | 4,337.50 | 1,149.30 | 24.00 | 3,164.20 | 885.98 | 2,278.22 |
| | | | | | | | | | | | |
| 26444 | BEAM | Long | 6/4/1999 | 1,312.50 | - | 1,312.50 | 405.62 | 4.00 | 902.88 | 252.81 | 650.07 |
| 27475 | EMBU | Long | | 7,950.00 | 7,950.00 | - | 102.50 | - | - | - | - |
| 92731 | EBAY | Long | | (1,890.63) | (1,890.63) | - | 102.50 | 2,686.69 | - | - | - |
| - | UAL | Long | | (156.25) | (156.25) | - | 102.50 | - | - | - | - |
| 46520 | TSEMF | Long | 6/24/1999 | 75.00 | - | 75.00 | 37.56 | - | 37.44 | 10.48 | 26.96 |
| 46518 | TSEMF | Long | 6/24/1999 | 31.25 | - | 31.25 | 17.57 | - | 13.68 | 3.83 | 9.85 |
| 46509 | TSEMF | Long | 6/24/1999 | 312.50 | - | 312.50 | 155.16 | - | 157.34 | 44.06 | 113.28 |
| 50069 | ANSI | Long | | 2,500.00 | 2,500.00 | - | 99.00 | - | - | - | - |
| 53199 | BEAM | Long | | (687.50) | (687.50) | - | 184.00 | 5,988.80 | - | - | - |
| 54801 | PBJHA | Long | | - | - | - | 184.00 | - | - | - | - |
| | | | | 9,446.88 | 7,715.63 | 1,731.25 | 1,390.41 | 8,679.49 | 1,111.34 | 311.18 | 800.16 |

| Taxes Paid | | | | | | | | | | 1,400.00 | |
| Year to Date Totals | | | | 33,000.00 | 25,096.88 | 7,903.13 | 4,181.94 | 10,851.39 | 4,643.31 | (99.87) | 3,343.18 |

Print  Graph

Figure 9T

NET WORTH REPORT PARAMETERS

Date Range [4/1/1999] to [6/30/1999]          Report Format: [Net Cash-YTD ▼]

Stock Selection:
    Long Positions ○
    Short Positions ○                                Pick Stocks [ALL ▼]
    Gain Positions ○
    Loss Positions ○                                Short-Term Positions ○
    Portfolio [AWC ▼]                               Long-Term Positions ○     [Proceed]

---

NET WORTH REPORT
YEAR TO DATE
April 1, 1999 through June 30, 1999

| Reference Number | Symbol | Positon | Date Bought | Date Sold | Current Value | Sold Basis | Bought Value | Gain/Loss | Commissions and Costs | Margin Interest | State and Federal Taxes | Net Worth |
|---|---|---|---|---|---|---|---|---|---|---|---|---|
| Cash Balance | | | | | | | | | | | | 15,493.43 |
| 28231 | HSY | Long | 4/7/1999 | | 5,200.00 | - | 5,568.75 | (368.75) | 62.50 | 2,058.52 | (697.13) | (1,792.63) |
| 47104 | EXDS | Long | 4/23/1999 | 5/13/1999 | - | 9,262.50 | 7,400.00 | 1,862.50 | 205.31 | 15.00 | 459.81 | 1,182.38 |
| - | HSY | Long | 4/20/1999 | 5/13/1999 | - | 6,500.00 | 5,500.00 | 1,000.00 | 205.31 | 14.38 | 218.49 | 561.83 |
| 88682 | EXDS | Long | 4/26/1999 | 6/23/1999 | - | 9,200.00 | 8,150.00 | 1,050.00 | 236.81 | - | 227.69 | 585.50 |
| 37751 | EMBU | Long | 4/22/1999 | | 10,000.00 | - | 4,150.00 | 5,850.00 | 50.00 | - | 1,624.00 | 4,176.00 |
| 37728 | EMBU | Long | 4/22/1999 | | 20,000.00 | - | 8,100.00 | 11,900.00 | 152.50 | - | 3,289.30 | 8,458.20 |
| 36694 | EXDS | Long | 4/27/1999 | 6/29/1999 | - | 5,378.13 | 5,250.00 | 128.13 | 236.68 | - | (30.40) | (78.16) |
| 69811 | BEAM | Long | 4/23/1999 | 5/27/1999 | - | 18,375.00 | 16,062.50 | 2,312.50 | 355.62 | - | 547.93 | 1,408.95 |
| 47892 | EBAY | Long | 4/27/1999 | 6/14/1999 | - | 6,225.00 | 10,743.75 | (4,518.75) | 137.50 | 60.00 | (1,320.55) | (3,395.70) |
| | | | | | 35,200.00 | 54,940.63 | 70,925.00 | 19,215.63 | 1,642.23 | 2,147.89 | 4,319.14 | 11,106.36 |
| 86388 | INTC | Long | 5/3/1999 | 5/5/1999 | - | 30,937.50 | 31,437.50 | (500.00) | 206.04 | - | (197.69) | (508.35) |
| 80027 | MCK | Long | 5/13/1999 | 6/14/1999 | - | 6,500.00 | 7,475.00 | (975.00) | 137.50 | 24.00 | (318.22) | (818.28) |
| 83194 | BEAM | Long | 5/27/1999 | 5/27/1999 | - | 22,562.50 | 16,750.00 | 5,812.50 | 805.76 | - | 1,401.89 | 3,604.85 |
| | | | | | - | 60,000.00 | 55,662.50 | 4,337.50 | 1,149.30 | 24.00 | 885.98 | 2,278.22 |
| 26444 | BEAM | Long | 6/2/1999 | 6/4/1999 | - | 19,562.50 | 18,250.00 | 1,312.50 | 405.62 | 4.00 | 252.81 | 650.07 |
| 27475 | EMBU | Long | 6/2/1999 | | 20,000.00 | - | 12,050.00 | 7,950.00 | 102.50 | - | 2,825.10 | 5,022.40 |
| 92731 | EBAY | Long | 6/4/1999 | | 6,225.00 | - | 8,115.63 | (1,890.63) | 102.50 | 2,686.69 | (935.96) | (3,743.85) |
| - | UAL | Long | 6/9/1999 | | 6,400.00 | - | 6,556.25 | (156.25) | 102.50 | - | (51.75) | (207.00) |
| 46520 | TSEMF | Long | 6/10/1999 | 6/24/1999 | - | 2,975.00 | 2,900.00 | 75.00 | 37.56 | - | 10.48 | 26.96 |
| 46518 | TSEMF | Long | 6/10/1999 | 6/24/1999 | - | 743.75 | 712.50 | 31.25 | 17.57 | - | 3.83 | 9.85 |
| 46509 | TSEMF | Long | 6/10/1999 | 6/24/1999 | - | 7,437.50 | 7,125.00 | 312.50 | 155.16 | - | 44.06 | 113.28 |
| 50069 | ANSI | Long | 6/24/1999 | | 11,375.00 | - | 8,875.00 | 2,500.00 | 99.00 | - | 864.36 | 1,536.64 |
| 53199 | BEAM | Long | 6/29/1999 | | 19,312.50 | - | 20,000.00 | (687.50) | 184.00 | 5,988.80 | (1,372.06) | (5,488.24) |
| 54801 | PBJHA | Long | 6/29/1999 | | 1,500.00 | - | 1,500.00 | - | 184.00 | - | (36.80) | (147.20) |
| | | | | | 64,812.50 | 30,718.75 | 86,084.38 | 9,446.88 | 1,390.41 | 8,679.49 | 1,604.06 | (2,227.09) |
| Year to Date Totals | | | | | 100,012.50 | 145,659.38 | 212,671.88 | 33,000.00 | 4,181.94 | 10,851.39 | 6,809.18 | 26,650.93 |

[Print]   [Graph]

Figure 9U

| HOLD | NET WORTH FINANCIAL POSITION STATEMENT | | | | | | |
|---|---|---|---|---|---|---|---|
| | FINANCIAL POSITION | | | | | | |
| | as of June 30, 1999 | | | | | | |

| Assets | | | Liabilities | | | | |
|---|---|---|---|---|---|---|---|
| Cash | | | Margin | | | 2,500.00 | - |
| | | | Margin Interest | | | 97.98 | |
| | | | Cash Invested | | | 3,102.50 | 2,500.00 |
| Short-Term Positions: | | | State Taxes Payable: | | | | |
| Unrealized-Gains | | | Unrealized Gains/Losses: | | | | |
| Unrealized-Losses | | 6,500.00 | Short-Term | | | 79.95 | |
| | | | Long-Term | | | - | 79.95 |
| | | | Realized Gains/Losses: | | | | |
| Long-Term Positions: | | | Short-Term | | | - | |
| Unrealized-Gains | | | Long-Term | | | - | - |
| Unrealized-Losses | | | | | | | |
| | | | Federal Taxes Payable: | | | | |
| | | | Unrealized Gains/Losses: | | | | |
| | | | Short-Term | | | 319.81 | |
| | | | Long-Term | | | - | 319.81 |
| | | | Realized Gains/Losses: | | | | |
| | | | Short-Term | | | - | |
| | | | Long-Term | | | - | 399.76 |
| Reserve for Taxes on Sold | | - | | | | 6,100.24 | |
| Net Proceeds on Sold | | - | Net Worth | | | 399.76 | |
| | | 6,500.00 | - | | | 6,500.00 | |

New Worth Activity Statement
April 1 through June 30

| | | | % of Total Revenues | % of Bought Basis | % Cash Invested | |
|---|---|---|---|---|---|---|
| Revenues: | | | 1,000.00 | 5,602.50 | 3,102.50 | |
| Short-Term Gains/Losses: | | | | | | |
| Unrealized: | | | | | | |
| Gains | 1,000.00 | | | | | |
| Losses | - | 1,000.00 | | | | |
| Realized: | | | | | | |
| Gains | - | | | | | |
| Losses | - | - | 1,000.00 | 100.00% | 17.85% | 32.23% |
| | | | | | | |
| Long-Term Gains/Losses: | | | | | | |
| Unrealized: | | | | | | |
| Gains | - | | | | | |
| Losses | - | - | | | | |
| Realized: | | | | | | |
| Gains | - | | | | | |
| Losses | - | - | - | 0.00% | 0.00% | 0.00% |
| Net Gaians/Losses | | | 1,000.00 | 100.00% | 17.85% | 32.23% |
| | | | | | | |
| Dividends: | | | | | | |
| Cash | - | | | | | |
| Stock | - | - | - | 0.00% | 0.00% | 0.00% |
| | | | | | | |
| Interest Income | | | - | 0.00% | 0.00% | 0.00% |
| | | | 1,000.00 | 100.00% | 17.85% | 32.23% |
| | | | | | | |
| Expenses: | | | | | | |
| Commissions | 102.50 | | | 0.00% | 0.00% | 0.00% |
| Other Costs | - | | | 0.00% | 0.00% | 0.00% |
| Margin Interest | 97.98 | | 200.48 | 20.05% | 3.58% | 6.46% |
| | | | | | | |
| Net Worth before Taxes | | | 799.52 | 79.95% | 14.27% | 25.77% |
| State and Federal Taxes | | | 399.76 | 39.98% | 7.14% | 12.89% |
| Net Worth after Taxes | | | 399.76 | 39.98% | 7.14% | 12.89% |

[ Print ]   [ Graph ]

Figure 9V-1

| SOLD | NET WORTH FINANCIAL POSITION STATEMENT | | | | | | |
|---|---|---|---|---|---|---|---|
| | FINANCIAL POSITION <br> as of June 30, 1999 | | | | | | |
| Assets | | Liabilities | | | | | |
| Cash | | Margin | | | | - | |
| | | Margin Interest | | | | - | |
| | | Cash Invested | | | | - | |
| Short-Term Positions: | | State Taxes Payable: | | | | | |
| Unrealized-Gains | | Unrealized Gains/Losses: | | | | | |
| Unrealized-Losses | - | Short-Term | | | | - | |
| | | Long-Term | | | | - | - |
| | | Realized Gains/Losses: | | | | | |
| Long-Term Positions: | | Short-Term | | | | - | |
| Unrealized-Gains | | Long-Term | | | | 62.43 | 62.43 |
| Unrealized-Losses | | | | | | | |
| | | Federal Taxes Payable: | | | | | |
| | | Unrealized Gains/Losses: | | | | | |
| | | Short-Term | | | | - | |
| | | Long-Term | | | | - | - |
| | | Realized Gains/Losses: | | | | | |
| | | Short-Term | | | | - | |
| | | Long-Term | | | | 156.06 | 156.06  218.49 |
| Reserve for Taxes on Sold | 218.49 | | | | | | 218.49 |
| Net Proceeds on Sold | 561.83 | Net Worth | | | | | 561.83 |
| | 780.32 | - | | | | | 780.32 |

New Worth Activity Statement
April 1 through June 30

| | | | % of Total | % of Bough | % Cash | | |
|---|---|---|---|---|---|---|---|
| | | | Revenues | Basis | Invested | | |
| Revenues: | | | ###### | ###### | ###### | | |
| Short-Term Gains/Losses: | | | | | | | |
| Unrealized: | | | | | | | |
| Gains | - | | | | | | |
| Losses | - | - | | | | | |
| Realized: | | | | | | | |
| Gains | - | | | | | | |
| Losses | - | - | - | 0.00% | 0.00% | 0.00% | |
| Long-Term Gains/Losses: | | | | | | | |
| Unrealized: | | | | | | | |
| Gains | - | | | | | | |
| Losses | - | - | | | | | |
| Realized: | | | | | | | |
| Gains | 1,000.00 | | | | | | |
| Losses | - | 1,000.00 | 1,000.00 | 100.00% | 17.85% | 32.23% | |
| Net Gaians/Losses | | | 1,000.00 | 100.00% | 17.85% | 32.23% | |
| Dividends: | | | | | | | |
| Cash | - | | | | | | |
| Stock | - | - | - | 0.00% | 0.00% | 0.00% | |
| Interest Income | | - | 0.00% | 0.00% | 0.00% | | |
| | | | 1,000.00 | 100.00% | 17.85% | 32.23% | |
| Expenses: | | | | | | | |
| Commissions | 205.31 | | | 0.00% | 0.00% | 0.00% | |
| Other Costs | - | | | 0.00% | 0.00% | 0.00% | |
| Margin Interest | 14.38 | | 219.69 | 21.97% | 3.92% | 7.08% | |
| Net Worth before Taxes | | | 780.32 | 78.03% | 13.93% | 25.15% | |
| State and Federal Taxes | | | 218.49 | 21.85% | 3.90% | 7.04% | |
| Net Worth after Taxes | | | 561.83 | 56.18% | 10.03% | 18.11% | |

[ Print ]   [ Graph ]

Figure 9V-2

NET WORTH FINANCIAL POSITION STATEMENT

FINANCIAL POSITION
as of June 30, 1999

| Assets | | | Liabilities | | | |
|---|---|---|---|---|---|---|
| Cash | | 15,493.43 | Margin | | | 16,000.00 |
| | | | Margin Interest | | | 10,734.03 |
| | | | Cash Invested | | | 59,955.13 |
| Short-Term Positions: | | | State Taxes Payable: | | | |
| Unrealized-Gains | | | Unrealized Gains/Losses (deferred): | | | |
| Unrealized-Losses | | 100,012.50 | Short-Term | | - | |
| | | | Long-Term | | 2,844.38 | 2,844.38 |
| | | | Realized Gains/Losses (current): | | | |
| Long-Term Positions: | | | Short-Term | | - | |
| Unrealized-Gains | | | Long-Term | | 371.46 | 371.46 |
| Unrealized-Losses | | | | | | |
| | | | Federal Taxes Payable: | | | |
| | | | Unrealized Gains/Losses (deferred): | | | |
| | | | Short-Term | | - | |
| | | | Long-Term | | 2,664.67 | 2,664.67 |
| | | | Realized Gains/Losses (current): | | | |
| | | | Short-Term | | - | |
| | | | Long-Term | | 928.66 | 928.66 |
| Reserve for Taxes on Sold | | (99.87) | | | | 93,498.33 |
| | | | Taxes Paid | | | (1,400.00) |
| | | | | | | 92,098.33 |
| Net Proceeds on Sold | | 3,343.18 | Net Worth | | | 26,650.91 |
| | | 118,749.24 | | | | 118,749.24 |

New Worth Activity Statement
April 1 through June 30

| | | | % of Total Revenues | % of Bought Basis | % Cash Invested | |
|---|---|---|---|---|---|---|
| Revenues: | | | 50,966.66 | 215,247.29 | 169,747.29 | |
| Short-Term Gains/Losses: | | | | | | |
| Unrealized: | | | | | | |
| Gains | 25,096.88 | | | | | |
| Losses | | 25,096.88 | | | | |
| Realized: | | | | | | |
| Gains | 7,903.13 | | | | | |
| Losses | | 7,903.13 | 33,000.00 | 64.75% | 15.33% | 19.44% |
| Long-Term Gains/Losses: | | | | | | |
| Unrealized: | | | | | | |
| Gains | 27,796.00 | | | | | |
| Losses | (14,472.65) | 13,323.35 | | | | |
| Realized: | | | | | | |
| Gains | 11,310.66 | | | | | |
| Losses | (6,667.35) | 4,643.31 | 17,966.66 | 35.25% | 8.35% | 10.58% |
| Net Gains/Losses | | | 50,966.66 | 100.00% | 23.68% | 30.03% |
| Dividends: | | | | | | |
| Cash | | - | | | | |
| Stock | | - | - | 0.00% | 0.00% | 0.00% |
| Interest Income | | | - | 0.00% | 0.00% | 0.00% |
| | | | 50,966.66 | 100.00% | 23.68% | 30.03% |
| Expenses: | | | | | | |
| Commissions | | 4,181.94 | | 0.00% | 0.00% | 0.00% |
| Other Costs | | - | | 0.00% | 0.00% | 0.00% |
| Margin Interest | | 10,851.40 | 15,033.34 | 29.50% | 6.98% | 8.86% |
| Net Worth before Taxes | | | 35,933.31 | 70.50% | 16.69% | 21.17% |
| State and Federal Taxes | | | 6,809.17 | 13.36% | 3.16% | 4.01% |
| Net Worth after Taxes | | | 29,124.14 | 57.14% | 13.53% | 17.16% |

[ Print ]  [ Graph ]

Figure 9V-3

SECTOR DEFINITION

| User: | AWC |
|---|---|

| Stocks in Portfolio: | Current Classification: | Select Classification 1: | Input Weight in % | Select Classification 2: | Input Weight in % |
|---|---|---|---|---|---|
| HSY | Confectioners | Confectioners ▶ | 100 | ▶ | |
| EXDS | Internet | Internet ▶ | 100 | ▶ | |
| EMBU | Internet | Internet ▶ | 100 | ▶ | |
| BEAM | Med. Instruments | Med. Instruments ▶ | 100 | ▶ | |
| EBAY | Internet | Internet ▶ | 100 | ▶ | |
| INTC | Semiconductors | Semiconductors ▶ | 100 | ▶ | |
| MCK | Drugs | Drugs ▶ | 100 | ▶ | |
| AOL | Internet | Internet ▶ | 100 | ▶ | |

WHAT-IF Scenario

Date: 4/1/1999   Portfolio: AWC ▼

Stock Selection:

| HSY |
| EXDS |
| EMBU |
| BEAM |
| EBAY |
| INTC |
| MCK |
| ALL |

[ADD]

[REMOVE]

Hypothetical Sales:

---

FINANCIAL POSTION
as of June 30, 1999

| Assets | | Liabilities & Equity | |
|---|---|---|---|
| Cash | 5,000 | Margin | 16,000 |
| Cash-Net Proceeds on Sold | 2,554 | Margin Interest | 382 |
| Securities Current Basis | 100,013 | Taxes Payable | 12,743 |
| | | Cash Invested | 59,955 |
| Reserve for Taxes on Sold | 2,089 | Net Worth | 20,575 |
| | 109,656 | | 109,656 |

Net Worth Activity

| | | Total Revenues | Bought Basis | Cash Invested |
|---|---|---|---|---|
| | | 33,000 | 67,013 | 59,955 |
| Net Gains/Losses | 33,000 | 100.00% | 49.24% | 55.04% |
| Dividends/Interest | | 0.00% | 0.00% | 0.00% |
| | 33,000 | 100.00% | 49.24% | 55.04% |
| Commissions & Costs | 4,182 | 12.67% | 6.24% | 6.98% |
| Margin Interest | 499 | 1.51% | 0.75% | 0.83% |
| | 4,681 | 14.19% | 6.99% | 7.81% |
| Net Worth before Taxes | 28,319 | 85.81% | 42.26% | 47.23% |
| State and Federal Taxes | 12,743 | 38.62% | 19.02% | 21.25% |
| Net Worth after Taxes | 15,575 | 47.20% | 23.24% | 25.98% |

[Print]   [Graph]

Figure 12

INVESTMENT PORTFOLIO TRACKING SYSTEM AND METHOD

BACKGROUND OF THE INVENTION

1. Field of the Invention

The invention relates generally to a management system for investments and, more particularly, to a system and method that track performance of investments that are kept in one or more accounts with a computer that accesses investment records from the account databases over a computer network, such as the Internet, and generates comprehensive accounting and financial reports of security investment portfolios.

2. Description of the Related Art

On-line trading has increased at a rapid pace in recent years due in large measure to the ever increasing popularity of the Internet. On the investor's side, the popularity of on-line trading has come in large part from lower commissions, easy access to research and news information, real-time quote services, real-time confirmation of trading, and the ability to view such information in a graphic or tabular format upon user demand.

On the services side, more financial institutions have begun offering on-line trading services to meet the increased demand from investors. Managing investor accounts on-line is attractive to financial institutions for several reasons. First, on-line trading requires significantly less manpower to operate than traditional investment services provided through telephone or in person. This is because many of the tasks that were previously handled by brokers and data entry personnel can be carried out automatically by a computer. In essence, the investor becomes the broker and the data entry person, as it is the investor who makes a decision on a trade based on the research that he or she has conducted and remotely enters the information for executing the trade. Second, financial institutions have discovered that the ease of on-line trading invites more trading. Therefore, whatever discounts in commissions that are offered to investors is made up in part by the increased trading volume.

It is common today for an investor to have multiple trading accounts. An investor may have one trading account with a traditional broker, one with a favorite on-line broker, and another with an on-line broker offering the lowest commission on trades. The investor typically receives a monthly statement from each of these brokers. The monthly statement provides a summary of the trading activity for that month and a snapshot of the investments currently held. If the account is accessible on-line, the account holder may retrieve this and other information over the Internet, such as a history of transactions, investments currently held, and a portfolio summary indicating cash available, amount borrowed on margin, value of the investments currently held, and net portfolio value.

To keep track of all of his or her investments collectively, the investor will need to purchase an investment tracking software or set up an account at an investment management web site. These forms of tracking investments, however, are very limiting. The investment tracking software that is available are sometimes very limiting in that it is not plugged into a database of current stock prices and is thus unable to update the status of the investment portfolio in real-time. The investment management web site is limiting in that it keeps track of only the investments that are currently held and not sold positions. Once an investment is sold or otherwise closed out, that investment is deleted from the portfolio. As a result, the investor is unable to track the performance of all of his or her investments, past and present.

In general, the investment portfolio tracking systems that are currently available provide only the basic information about investments. For example, most systems are available to provide a gross rate of return on a stock investment based on that stock's current price and the purchase price, but they do not take into account other factors that are relevant in computing a more representative rate of return, e.g., the holding period, the commissions that were paid, the amount of cash that was invested for that investment, the tax liability if that investment was closed out, etc.

Therefore, investors are currently unable to track their investment portfolio in a meaningful and useful way. Moreover, if they have multiple accounts, they are unable to track the performance of their investments collectively, unless they undergo the cumbersome process of entering their investment transactions into a software or web site database. Even so, they would still be unclear about the true collective performance of their investment portfolios, because they would receive only the basic performance information which does not take into account all of the factors that are necessary to give a meaningful rate of return on the money invested.

There currently is no standardization of accounting and financial presentation of investment portfolios, which gives pertinent, easy to understand information to investors. Further, there currently is no financial service or software that tracks the performance and current real net worth of a portfolio of investments after commissions, other costs, margin interest and taxes. An investor desiring such information needs to perform the analysis using a spreadsheet, but this way of generating tracking investments is prone to errors, time consuming, and virtually impossible to do for an extended period of time.

SUMMARY OF THE INVENTION

An object of the invention is to perform the accounting and financial analysis for the investor to produce comprehensive reports on the performance and/or current real net worth of an investment portfolio automatically based on the transaction data of the investment portfolio.

Another object of the invention is to provide an investment portfolio tracking system that receives a user request to generate a performance report and automatically retrieves the necessary transaction data to generate the performance report from one or more of the user's trading accounts that are kept at different places.

Still another object of the invention is to provide an investment tracking system that is able retrieve transaction data from a plurality of different accounts and to generate a single financial report that is representative of the collective performance of all of the different accounts.

The above and other objects of the invention are achieved with a server computer, programmed as an application service provider (ASP) or a web site, that is connected over a computer network, such as the Internet, to different account databases and to computers of end users, which include individual investors and professional money mangers.

The web site is responsive to user requests made using a browser interface, programmed on the user's computer, e.g., Netscape Navigator or Internet Explorer, to produce a double-entry, real-time presentation of various user-requested financial reports. One form of a user-requested financial report is similar to a balance sheet and profit/loss statements, including commissions, other costs, margin, margin interest, cash invested, and related income tax expenses and liabilities. The investments or securities may be any publicly traded securities including stocks and bonds (individually and/or mutual funds), both short and long positions, and options, both puts and calls.

The financial reports generated by the investment portfolio tracking system according to embodiments of the invention comply with GAAP (General Accepted Accounting Principles) and are completely auditable. Further, the single entry to double entry system employs built-in checks and balances so that accounting errors are eliminated.

Additional objects, features and advantages of the invention will be set forth in the description of preferred embodiments which follows.

BRIEF DESCRIPTION OF THE DRAWINGS

The invention is described in detail herein with reference to the drawings in which:

FIG. 3 is a sample registration page of the web site;

FIG. 4 is a page that is displayed to the user when the user successfully logs into the web site;

FIG. 6 is sample page for inputting tax payment information;

FIGS. 7A–7F are sample pages for inputting securities transaction data;

FIG. 8 is a portfolio summary page that shows the balance sheet and the net worth activity for that portfolio;

FIGS. 9A–9V are several other sample reports generated by the investment portfolio tracking system according to an embodiment of the invention;

FIG. 10 is a sample input screen for manually classifying stocks into industry sectors;

FIG. 12 is a sample input screen for inputting hypothetical sales and a sample output screen generated after execution of the hypothetical sales.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
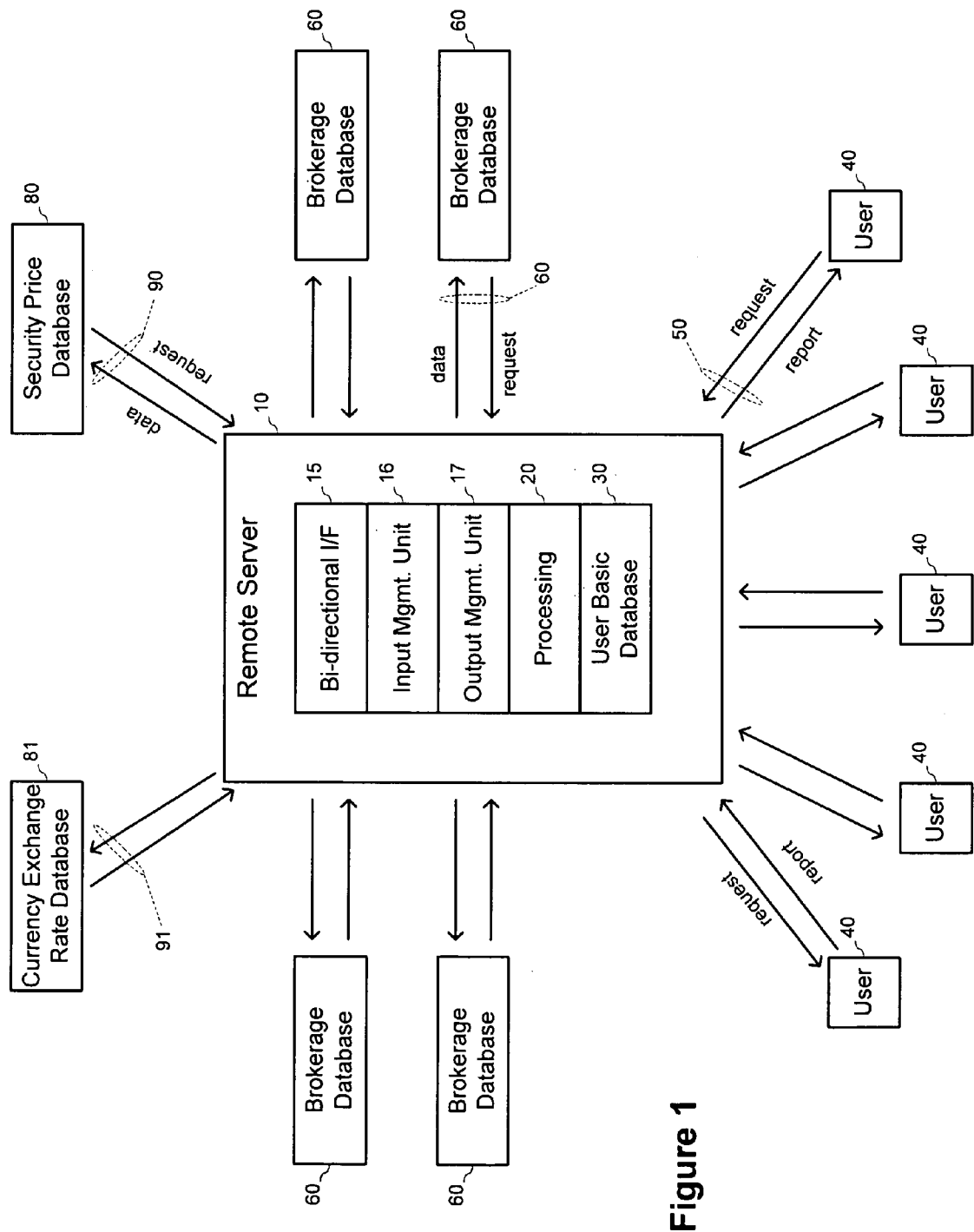
FIG. 1 is a schematic illustration of the investment portfolio tracking system according to an embodiment of the invention.

The investment portfolio tracking system according to an embodiment of the invention is illustrated in FIG. 1 as a remote server 10, including a processing unit 20 and a database 30. The remote server 10 is an internet ASP (Application Service Provider) or a web site and is programmed as an investment portfolio management system for use by individual investors and professional money managers.

In another embodiment of the invention, the remote server 10 is an intranet server for a brokerage house, an investment bank, an on-line broker, or any other entity that manages investment accounts. Hereinafter, a brokerage house, an investment bank, an on-line broker, or any other entity that manages investment accounts will be referred to as a "financial institution." In general, a "financial institution" is any entity, virtual or real, that sells, deals, and/or warehouses currency, equity investments, and/or mortgages.

The remote server 10 is connected to a plurality of user computers 40 over a network connection 50, to a plurality of financial institution databases 60 over a network connection 70, to a security price database 80 over a network connection 90, and to a currency exchange rate database 81 over a network connection 91.

The user computers 40 may take a variety of forms. They may be personal computers, desktop and laptop, hand-held computers capable of both a hard-wire and wireless network connection, e.g., Palm Pilot®. The network connections 50, 70, 90, 91 may be any one or combination of the following: Internet, intranet, extranet, local area network (LAN), wide area network (WAN), and the connections may be hard-wired or wireless, e.g., cellular, PCS, infrared, satellite, etc., or any combination of these.

The remote server 10 is connected to the network connections 50, 70, 90, 91 through a bi-directional communication interface 15 for sending out requests for data, such as transaction data and security price data, and receiving the requested data. It also includes an input management unit 16 for receiving identification data about an investment portfolio and a request to generate a performance report of the investment portfolio from a client computer, and an output management unit 17 for transmitting data representative of the performance report to the requesting user. The processing unit 20 of the remote server 10 is programmed to generate the performance report of the investment portfolio from the transaction data and the security price data.

The interface between the user and the remote server is a browser, e.g., Netscape Navigator or Internet Explorer, that is programmed on the user's computer. Where the user's computer is a hand-held computer, the interface between the user and the remote server is a microbrowser. The input screens are user friendly and menu driven. Examples of the inputs screens will be given below.

Figure 2:
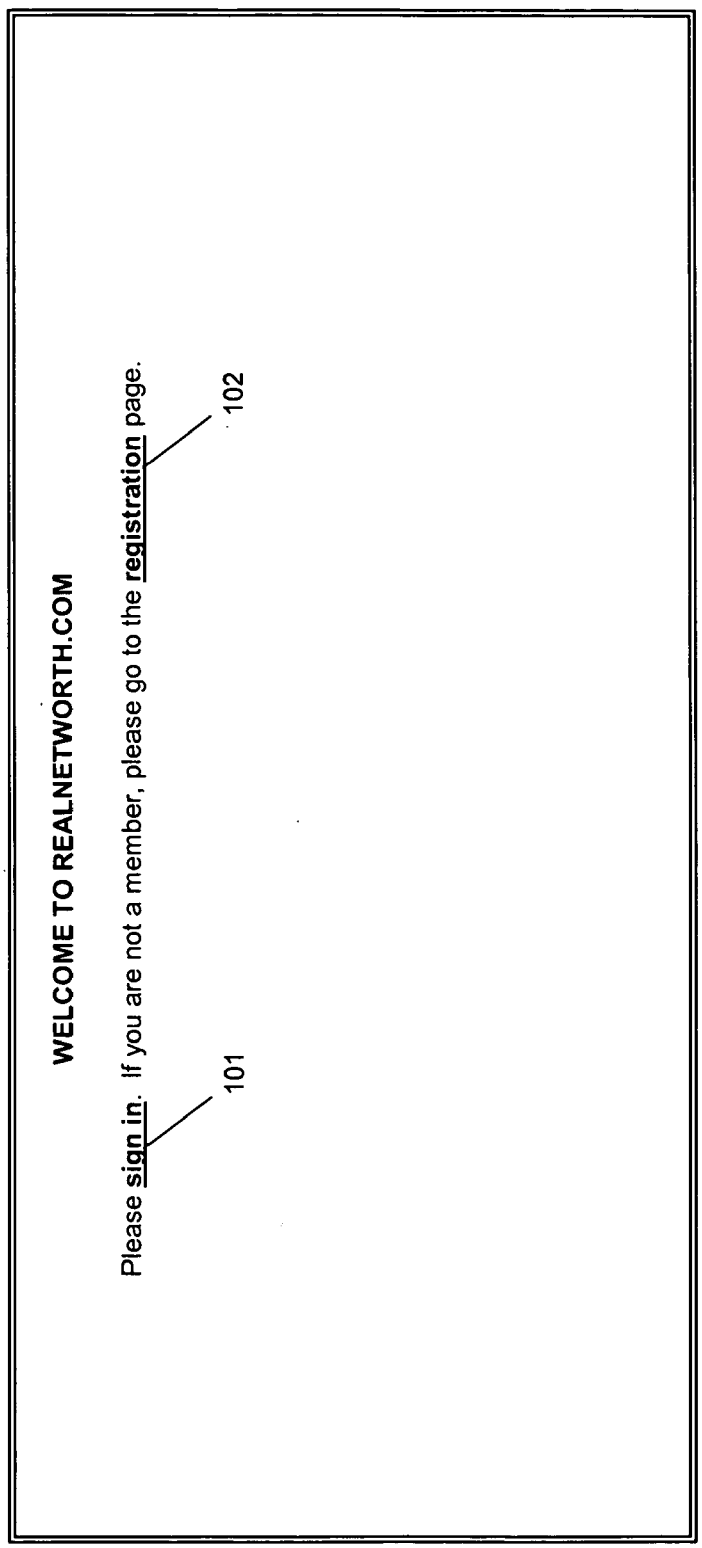
FIG. 2 is a sample home page of a web site that implements the investment portfolio tracking system according to an embodiment of the invention.

FIG. 2 is a sample home page that is displayed to a user who accesses the web site. The user accesses this home page by typing in its URL (Uniform Resource Locator), e.g., "www.realnetworth.com," into the browser. The home page includes a welcome message and hyperlinks 101, 102 to two other pages of the web site. If the hyperlink 101 is selected, the user is prompted to enter his or her username and password, and if the username and password are verified as being registered, a general information web page shown in FIG. 4 is displayed to the user. If the hyperlink 102 is selected, a registration web page shown in FIG. 3 is displayed to the user.

The registration web page prompts the user to select a username and password, to enter his or her contact information including company name (if any), address, phone number, and e-mail address, and to specify the service plan desired—(i) consultant, which is designed for those who manage portfolios on behalf of clients and does not impose any portfolio limit; professional, which is designed for professional traders and imposes a limit of 10 portfolios; and investor, which is designed for individual investors and imposes a limit of 5 portfolios. Other service plans may, of course, be provided. Each of these selections are hyperlinked to a web page (not shown) that describes the pricing structure and the service plan in more detail. This web page also prompts the user for payment method and information. All of the inputted information is maintained in the database 30 of the remote server 10.

Further, the end user of the investment portfolio tracking system need not be individuals, professionals, or consultants. The end user may be the government, e.g., the Internal Revenue Service, the stock exchanges, e.g., the New York Stock Exchange, American Stock Exchange and NASDAQ, or any of the financial institutions.

The general information web page shown in FIG. 4 displays the username, the company name (if any), and the list of portfolios that the user has set up. It also displays the user's state and federal tax rates for capital gains, both short term and long term and the method of interest compounding. The default values and selection are shown in FIG. 4, and the user may change any of the values and selection. The web site will store the updated information in the database 30 and display them the next time the user accesses this page.

The general information web page also provides four hyperlinks for portfolio management, 121–124, a hyperlink 125 to input tax payments, and a hyperlink 127 for entering portfolio transaction data manually. Hyperlink 121 (View) displays a portfolio summary for the portfolio that the user specified in menu 126. In this example, the user specified the portfolio AWC, and so, upon selecting hyperlink 121, the portfolio summary for the portfolio AWC will be displayed. An example of a portfolio summary is shown in FIG. 8. If the user specifies the portfolio ALL and selects the hyperlink 121, a combined portfolio summary of all the portfolios listed in the menu 126 will be displayed.

Figure 5:
FIG. 5 is a page displayed to the user when the user chooses to add a portfolio.

Hyperlink 122 (Add) permits the user to add a portfolio using the portfolio input page illustrated in FIG. 5. The portfolio input page prompts the user to specify a portfolio name and to select between an automatic or manual portfolio tracking method. With an automatic portfolio tracking method, the user inputs identification information about the investment account in which this portfolio is kept. The identification information includes the name of the financial institution (Portfolio Location), the account name or number, and the password for accessing the transaction data for that account from the financial institution database. With a manual portfolio tracking method, the user inputs all the transaction data related to that portfolio using the input screens shown in FIGS. 7A–7F.

Hyperlink 123 (Edit) permits the user to edit any of the information that he or she entered when adding the portfolio. One aspect of the portfolio that the user may edit is the industry classifications for each of the stocks in the portfolio. The editing of the industry classifications is carried out using the input screen of FIG. 10. Hyperlink 124 (Delete) permits the user to delete the portfolio that the user specified in the menu 126.

Hyperlink 125 (Tax Payments) displays a tax payment page illustrated in FIG. 6. The tax payment page is used to input the tax payments which the user may make from quarterly taxes needed on ordinary income as well as on gains made on stock trades. This information is not available to financial institution databases. Therefore, regardless of whether the user selected an automatic or manual method of tracking his or her portfolio, the tax payment information must be entered manually using this page. However, it is possible to automate this data gathering procedure also, e.g., by tapping into database of the Internal Revenue Service, by accessing an on-line bank account from which the tax payments are regularly made, or by accessing a database of the Certified Public Accountant who regularly makes the tax payments on behalf of the user, etc.

When hyperlink 127 (Manual Inputs) is selected, the user is prompted to enter the transaction data for the portfolio specified in the menu 126. The input screens for entering the transaction data are shown in FIGS. 7A–7F. The input screen of FIG. 7A records BUY transactions. The input screen of FIG. 7B records SELL transactions. The input screen of FIG. 7C records adjustments to the margin balance. The input screen of FIG. 7D records dividend distributions. The input screen of FIG. 7E records stock splits. The input screen of FIG. 7F records cash adjustments. All manually entered data are stored in the database 30.

The processing unit 20 of the remote server 10 is programmed to generate one or more financial reports requested by the user based on the transaction records of the user that are retrieved from the database 30 and/or the financial institution databases 60, and the current or past security price information retrieved from the security price database 80. Preferably, the current price of a security reflects the most recent sale price of that security as traded in the exchange in which that security is listed. However, the invention may be implemented with a database in which the current price of a security is the most recent sale price of that security, including trades that occur in after-hours exchanges.

The financial report request of the user is sent from the user computer 40 to the remote server 10 which then determines the location of the necessary data and retrieves it. Once the remote server 10 has retrieved the necessary data, the system can perform the necessary processing and calculations to generate the data for the financial reports requested by the user. The data is then formatted into the requested report presentation and transmitted back to the user's web browser screen. The user is able to view the report and then print the report if desired. Examples of the financial report output screens are provided below. It is not necessary, although it is possible, to store the financial report output at the remote server 10, because the user may store it locally on his or her computer 40 if the user wants to keep an electronic record of the report.

The web page illustrated in FIG. 8 provides a financial position report of a user's investment portfolio as of the current date and a default period. It includes a balance sheet including the real net worth of the user's investment portfolio (upper half), and the profit/loss activity of the user's investment portfolio for a set period (lower half). The user may change the relevant dates for this report by selecting the hyperlink 201 or the user may select a more detailed financial report by selecting any one of the links 202–220 (hyperlinks are depicted in FIG. 8 by boxes surrounding the text associated with the hyperlinks).

A number of other financial reports can be generated using the invention. These reports can be selected by using the drop down menu 221 illustrated in FIG. 8. The drop down menu includes all available financial reports. They are listed in the table below which provides an explanation of the financial report and the corresponding figure number. All of these reports comply with GAAP (General Accepted Accounting Principles) and are completely auditable.

| Report | FIG. | Description |
| --- | --- | --- |
| Bought | 9A | History of BOUGHT transactions |
| Sold | 9B | History of SOLD transactions. |
| Margin Alert | 9C | Indicates to the user those stocks that, on an individual basis, have fallen below the margin maintenance requirements. |
| Holding Period | 9D | Calculates the holding period for each stock (in months and days) in portfolio. |
| Dividend | 9E | History of dividend distributions, cash and stock. |
| Yield | 9F | Calculates the total, monthly, and annualized yield for the stocks that distributed dividends. |
| Commission | 9G | History of commissions that were charged to both BOUGHT and SOLD transactions. |
| Portfolio Status | 9H | Calculates the current gain/loss for each stock in portfolio. |
| Cash Activity | 9I | History of cash transactions, deposits, withdrawals, interest, etc. |
| Cash Invested | 9J | History of cash investments made by the user. |
| Margin Activity | 9K | History of margin loans in connection with stock purchases. |
| Margin Interest Expense | 9L | History of margin interest expenses that were incurred in connection with the margin loans. |
| Margin Interest Payable | 9M | History of margin interest payments based on whether the investment in stocks procured on margin was closed out. |
| Gross Gain/Loss (Month End) | 9N-1 | Calculates gain/loss, both realized and unrealized, for each stock in portfolio, without taking into account commissions, other costs, margin interest, and taxes. The period for the report is "Month End," which means that the report looks at the performance of investment purchases made during a particular month, by freezing that month's performance and not reflecting any after month end activity. |
| Net Gain/Loss (Month's End) | 9N-2 | Calculates gain/loss, both realized and unrealized, for each stock in portfolio, while taking into account commissions, other costs, and margin interest. This is a "Month End" report and taxes are not accounted for in this report. |
| Gross Gain/Loss (Year-To-Date) | 9N-3 | Calculates gain/loss, both realized and unrealized, for each stock in portfolio, without taking into account commissions, other costs, margin interest, and taxes. The period for this report is "Year-To-Date," which means that the report reflects current year's performance through the date of the report. This enables the user to measure the current performance of the portfolio or to see the year-to-date performance of securities bought in previous months. |
| Net Gain/Loss (Year-To-Date) | 9N-4 | Calculates gain/loss, both realized and unrealized, for each stock in portfolio, while taking into account commissions, other costs, and margin interest. This is a "Year-To-Date" report and taxes are not accounted for in this report. |
| Gross Return on Securities (Month's End) | 9O-1 | Similar to Gross Gain/Loss (Month End) report, and in addition calculates a gross, monthly, and annualized rate of return based on the holding period. |
| Gross Return on Securities (Year-To-Date) | 9O-2 | Similar to Gross Gain/Loss (Year-To-Date) report, and in addition calculates a gross, monthly, and annualized rate of return based on the holding period. |
| Net Cash Return on Securities (Month's End) | 9P-1 | Similar to Net Gain/Loss (Month End) report, and in addition calculates a gross, monthly, and annualized rate of return based on the holding period. |
| Net Cash Return on Securities (Year-To-Date) | 9P-2 | Similar to Net Gain/Loss (Year-To-Date) report, and in addition calculates a gross, monthly, and annualized rate of return based on the holding period. |
| IRS Capital Gain/Loss Form | 9Q | Generates an IRS form Schedule D. Preferably, this report is automatically sent to CPA, lawyer, maybe even IRS. |
| Taxes Expense | 9R | Calculates the state and federal tax liability, both realized (current) and unrealized (deferred), for all stocks in portfolio. |
| Taxes Payable | 9S | Attributes taxes paid on realized stock transactions and calculates estimated taxes owed. |
| Cash Net Proceeds | 9T | Calculates the gain/loss for each stock in portfolio that has been sold while taking into account all costs including taxes. |
| Net Worth | 9U | Calculates the gain/loss for all stocks in portfolio while taking into account all costs including taxes. |
| Net Worth Financial Position (HOLD) | 9V-1 | Similar to FIG. 8, but includes an assumption that all stocks in portfolio are being held. |
| Net Worth Financial Position (SOLD) | 9V-2 | Similar to FIG. 8, but includes an assumption that all stocks in portfolio has been sold. |
| Net Worth Financial Position | 9V-3 | Same as FIG. 8. |
| Others | App. A | Year-To-Date - Net Book Value Return Month End - Net Book Value Return Year-To-Date - Gross Cash Return Month End - Gross Cash Return |

Each report shown in FIGS. 9A–9V has two sections, an input section and an output section. The input section displays parameters that the user may edit, and the output section displays the content of the report. The input section also has a "PROCEED" button which the user may use to regenerate the output section based on different parameters that he or she specified.

When each report is accessed from the portfolio summary page (FIG. 8), the input page displays the default values for the parameters and any values that are passed from the portfolio summary page. For example, the date range and the portfolio selection are passed from the portfolio summary page. The user is not constrained to these parameters, and may edit these parameters to customize the report that is produced in the output section.

For example, FIG. 9H is a Portfolio Status Report as of Jun. 30, 1999 for all stocks in the portfolio AWC. If the user wishes to generate a Portfolio Status Report with different parameters, e.g., for an earlier date, and/or for all of his or her portfolios, the user would input the earlier date in the input box 230, select ALL from the portfolio drop-down menu 231, and click on "PROCEED." The new Portfolio Status Report that is produced will be generated based on the new inputs.

The portfolio drop-down menu 231 of all reports (FIGS. 9A–9V) contains the same selections as the portfolio drop-down menu 126 of the General Information web page (FIG. 4). In addition, the portfolio drop-down menu 231 identifies the sectors in which the user holds investments, e.g., Transportation, Internet, Semiconductor, Retail, etc. If the user selects one of the sectors and clicks on "PROCEED," the financial report that is generated will be a composite report for all stocks in his or her portfolio that belong in that sector.

The classification of a stock into a particular sector is carried out by the remote server 10 based on the S&P classifications.

Alternatively, the user may define the classifications employing an input screen illustrated in FIG. 10. For each stock in the user's portfolio, the user is able to manually select up to two classifications and specify weighting factors as the user finds appropriate. The classifications that are displayed when the user accesses this input screen is either the most recent classifications specified by the user or, in the absence of this, the classifications as assigned by Standard and Poor (S&P). All of the S&P classifications are available to the user to choose from, in a drop-down menu format, when manually classifying the stocks in his or her portfolio. When the user clicks on "PROCEED," the changes specified by the user will be stored.

The financial reports can be outputted in a variety of different formats, in either cents or whole dollars. The format shown in FIGS. 9A–9V may be generated by the browser based on HTML (Hyper-Text Markup Language). A more stylized output incorporating images, graphics, and charts, e.g., in a PDF format, may be printed using the "PRINT" button or graphed using the "GRAPH" button from the financial report data.

Figure 11:
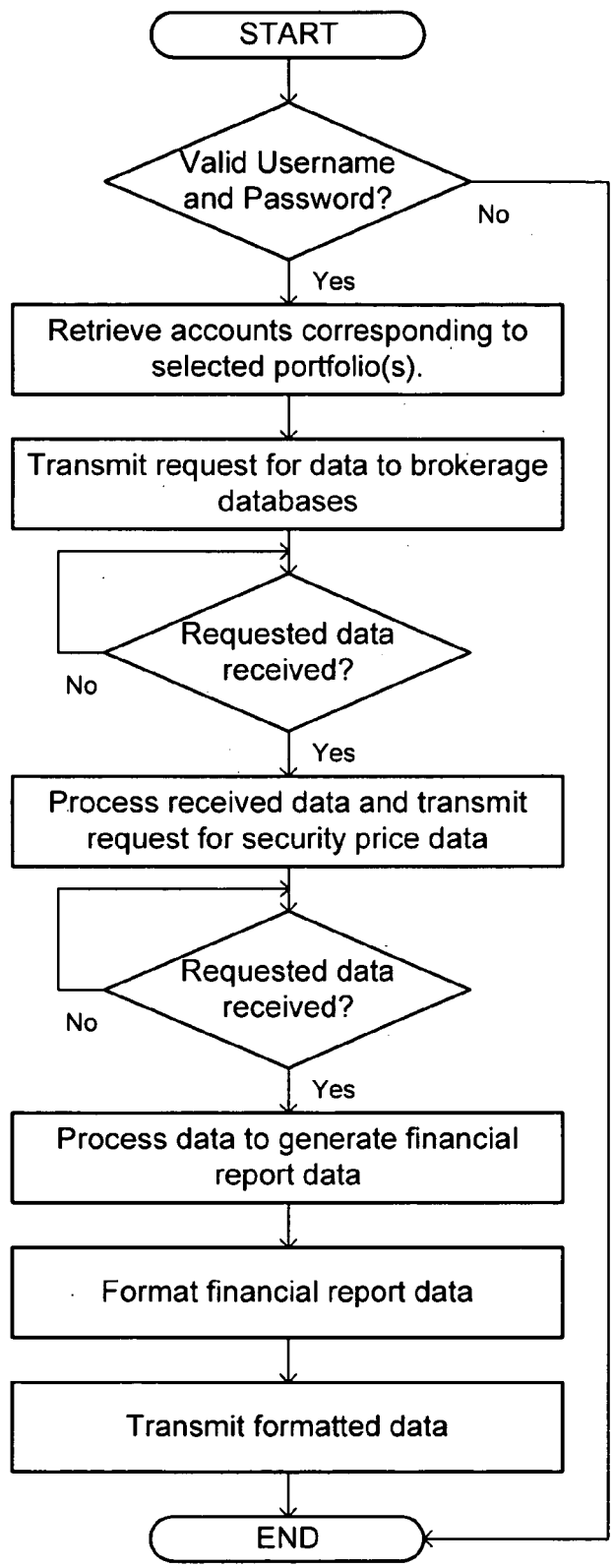
FIG. 11 is a flow diagram of the program steps that are executed by the remote server 10 when the user logs into the web site and accesses a portfolio.

FIG. 11 is a flow diagram of the program steps that are executed by the processing unit 20 of the remote server 10 when the user logs into the web site and requests one of the reports.

First, in Step 310, the username and password are checked against the list of valid usernames and passwords stored in the database 30. If either the username or the password is not valid, the program exits and the user is advised that the username and/or password are not valid. If the username and password are valid, the account identification information of the portfolio(s) selected using the menu 126 of FIG. 4 is retrieved in Step 320. This information includes, for each portfolio, the name of the financial institution, the account name or number, and the password for accessing the financial institution database 60. In Step 330, the remote server 10 transmits a request for transaction data, including the account name or number and the password, to one or more of the financial institution databases 60. The remote server 10 waits for a response from the financial institution databases 60 in Step 340, and when the requested data arrives, processes the data to figure out what security price data that it needs, e.g., security name and relevant dates, and transmits a request for security prices to the security price database 80 (Step 350). The remote server 10 waits for a response from the security price database 80 in Step 360, and when the requested data arrives, processes the this data and the transaction data it received from the financial institution databases 60 to produce the data for generating financial position report illustrated in FIG. 3 (Step 370). The actual formatting of this data to be placed in browser viewable format is done in Step 380 and the transmission of the formatted data is done in Step 390.

The retrieval of transmission data from the financial institution databases 60 may be performed in other ways that do not require the remote server 10 to act as a surrogate to the users. For example, the financial institutions may provide the investment portfolio management system according to another embodiment of the invention direct access to their databases in exchange for a fee, e.g., a flat annual fee for each user of the system who has his or her trades handled by them. This fee arrangement will provide a monetary incentive to the financial institutions to promote to their clients the use of the investment portfolio management system described herein. The annual fee incentive can be enhanced with branding dollars, in exchange for which the investment portfolio management system of the invention promotes those financial institutions who are providing access to their databases.

Further, as described above, the investment portfolio management system according to an embodiment of the invention provides the user with an option of inputting transaction data for a portfolio manually. Users who choose this option are offered discounts on using the investment portfolio management system, because the financial institution databases at which the accounts for these users are kept need not be accessed. As a consequence, the financial institutions need not be paid a fee for these accounts and the resulting savings can be passed onto the users. This option may be preferred by investors who make only a handful of trades per year. Further, the manual inputs permit the user to create and track a "paper trade" or mock investment portfolio.

The investment portfolio management system according to an embodiment of the invention may also be implemented with a feature to handle "what-if" scenarios defined by the user. With this feature, the user designates one or more currently-held securities for a hypothetical sale (as of the date specified on the input screen) and generates a performance report of his or her investment portfolio after taking into account this hypothetical sale or sales. FIG. 12 illustrates a sample input screen for a user who has accessed the what-if scenario hyperlink. The input screen lists all of the securities that the user is currently holding in the specified portfolio. The user designates a listed security for a hypothetical sale by checking the box that is displayed next to that security. A box is also displayed next to the option "Sell All Securitiues."

The "what-if" scenario feature is useful, because it allows the user to see what the true return on his investment would be if the user decides to sell that security on that day. Absent the what-if scenario, the return on investment is based on unrealized gains and losses. Unrealized gains and losses do not take into account the commission that is charged upon sale of a security and the tax consequences on the realized gains and losses.

The investment portfolio management system according to an embodiment of the invention further provides a unique "single entry" method of producing a "double entry" accounting presentation, and produces the tracking and reporting of cash accounts, cash invested, and margin accounts.

The Securities and Cash Invested Return on Investment reports (FIGS. 9O-1, 9O-2, 9P-1, 9P-2) provide a weighted monthly and annualized rate of returns to correctly account for securities that are held less than 30 days and for securities that are bought mid-month and sold before the close of that month.

The Gain/Loss reports (FIGS. 9N-1, 9N-2, 9N-3, 9N-4), the Securities Return on Investment reports (FIGS. 9O-1, 9O-2), and Cash Return on Investment reports (FIGS. 9P-1, 9P-2), all described above, have four different presentation types. They are categorized as unrealized (investments that are held), realized (investments that are sold), short-term (investments that are held less than twelve months), and long-term (investments that are held more than twelve months). The short-term and long-term periods, as defined, are the current time periods recognized by the Internal Revenue Service.

With these categories, the investment portfolio management system according to an embodiment of the invention can calculate the state and federal tax liabilities that result from a stock transaction, using identified short-term and long-term tax rates for state and federal taxes that the user specifies. State and federal taxes may also be presented in deferred and current categories relating to unrealized and realized gains and losses, respectively. The investment portfolio management system also gives the user the capabilities of e-mailing quarterly reports to his or her tax preparer who provides estimated tax payment services.

Based on the all the reports that are generated, investment portfolio management system produces net worth financial position statements for the investor. This statement may be for one portfolio or for all portfolios. The financial position statement, which is comparable to a balance sheet, is generated for a point of time, that the user specifies. The statement takes into account current value of securities, reserve for taxes on sold securities, net cash proceeds on sold positions, margin and margin interest, cash invested, state and federal taxes (unrealized, realized and short-term, long-term), and net worth.

The detailed net worth activity statement, which is comparable to a profit/loss statement, is provided for a period of time. It reflects short-term gains and losses, both unrealized and realized, and long-term gains and losses, both unrealized and realized, dividends, cash and stock, interest income, commissions, other costs, margin interest, and state and federal taxes. These results are also presented as a percentage basis of total revenues, a percentage basis of bought basis, and a percentage basis of average outstanding cash invested. These statements are presented in real-time, with an option for providing automatic updates at any period specified by the user, e.g., 1 minute, 10 minutes, 1 hour, etc.

Embodiments of invention described above rely in part on formulas to generate the reports illustrated in FIGS. 9A–9V. These formulas have been tested out on a master spreadsheet, which is attached hereto as Appendix A. Appendix B provides a formula reference sheet which sets for the source or formula for the numbers that are shown in the master spreadsheet. Appendix A also contains four reports, labeled "Others" in the report table provided above. These reports are provided as part of the drawings.

In the description given herein, a purchase or buying of a security includes both buying of a security for subsequent selling thereof for realization of the gain or losses based on the rise or fall of the security's price, and selling of a security for subsequent buying thereof for realization of the gains or losses from the fall or rise in the security's price. This latter method is known as "short selling." The invention is also applicable to options investing, in which the buying is referred to as a "call" and the short selling is referred to as "put." The invention is further applicable to mutual funds, bonds, and all other types of investment vehicles.

Also, the financial report generating feature of embodiments of the invention described above may be implemented in software that resides in a server computer for a particular financial institution. The server computer may be an intranet server or a local area network server. In any event, brokers, employed by the financial institution, would access this server computer over the internal network (intranet), and generate various financial reports for clients who have accounts with the financial institution. In the course of generating the financial reports, the server computer would tap into the database of the financial institution to obtain the necessary transaction records and security price data. In this implementation, access to an external database is not necessary.

Further, the investment portfolio tracking system may be configured to generate reports in several different foreign languages and to be applicable not only to investments bought and sold in dollars, but also to investments bought and sold with foreign (or hypothecated) currencies. The conversion of the report data into dollars or any other user-specified currency would be based on the currency exchange rate retrieved from the currency exchange rate database 81.

Figure 13:
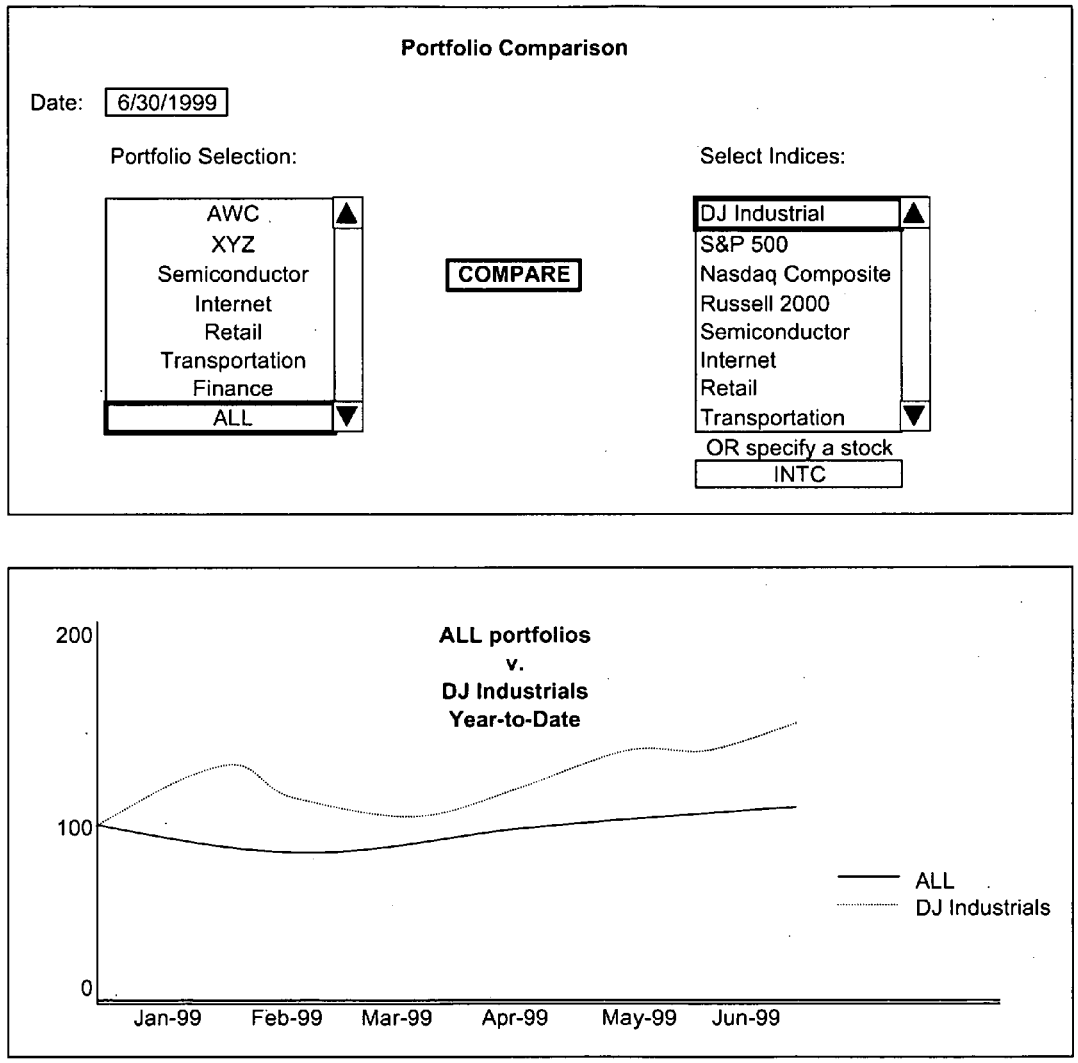
FIG. 13 is a graphical report that is based on the performance comparison between one or more portfolios and a stock index.

In another embodiment of the invention, the user may conduct a comparison between the performance of any one or combination of his or her investment portfolio and the general indices, e.g., Dow Jones Industrial index, S&P 500 index, NASDAQ Composite index, Russell 2000 index, etc. A sample comparison report is shown in FIG. 13. Other types of comparisons are possible too. For example, the combined performance of stocks classified in the Internet sector may be compared against a common Internet index, e.g., Goldman Sachs Internet Index.

In the input screen for this report, the user specifies one or more portfolios that he or she would like to compare and the index against which the one or more portfolios are to be compared. In the example, ALL portfolios are specified for comparison against the Dow Jones Industrial index. The comparison result is displayed as a historical chart as illustrated in the bottom part of FIG. 13.

The comparison need not be against an index. It may be against a single stock. For example, if the user wanted a graphical report on how his or her semiconductor stocks performed against Intel Corp., which is considered to be a bellweather stock in the semiconductor sector, the user manually inputs the ticker symbol for Intel Corp.—INTC— and click on "COMPARE."

While particular embodiments of the invention have been illustrated and described above, it will be clear that the invention can take a variety of forms and embodiments within the scope of the appended claims.

I claim:

1. A computer implemented method of producing a financial position report for an investment portfolio, comprising:
   obtaining single entry transaction data records for individual transactions of the investment portfolio;
   receiving user input data representing a request for a financial position report for the investment portfolio;
   calculating current double entry asset, liability and equity balances for the investment portfolio as a whole using the transaction data records and current prices for investments held in the investment portfolio, wherein the sum of the portfolio asset balances equals the sum of the portfolio liability balances and the portfolio equity balances, and wherein the liability balances include balances that reflect obligations that would result if all investments of the investment portfolio were liquidated at said current prices;
   generating a financial position report for the portfolio that presents the asset, liability and equity balances of the portfolio in a double entry format, wherein at least some of the asset, liability and equity balances displayed in the financial position report are associated with hyperlinks to corresponding reports supporting the associated balances;
   transmitting the financial position report to the user; and
   in response to receiving user input data representing user selection of one of said hyperlinks associated with one of said balances, transmitting a report to the user supporting the balance associated with the selected hyperlink.

2. The method claimed in claim 1, wherein a transaction data record comprises a date, an identifier of a security, a number of shares, a transaction price, and a transaction type.

3. The method claimed in claim 2, wherein the transaction data record further comprises a cash disbursed amount.

4. The method claimed in claim 3, wherein the transaction data record further comprises a margin borrowed amount.

5. The method claimed in claim 1, further comprising:
receiving user input comprising transaction data characterizing a hypothetical what-if transaction;
recalculating said asset, liability and equity balances for the portfolio using said transaction data records and said what-if transaction data; and
transmitting to the user said financial position report using said recalculated asset, liability and equity balances.

6. The method claimed in claim 1, wherein the asset balances include a cash balance.

7. The method claimed in claim 6, wherein the cash balance is associated with a hyperlink to a cash balance report.

8. The method claimed in claim 7, wherein the cash balance report describes cash transactions of the portfolio and a cash balance remaining after each of said cash transactions.

9. The method claimed in claim 1, wherein the asset balances include a securities current basis balance.

10. The method claimed in claim 9, wherein the securities current basis balance is associated with a hyperlink to a portfolio status report.

11. The method claimed in claim 10, wherein the portfolio status report includes current value and gain and loss data for securities currently held in the portfolio.

12. The method claimed in claim 11, wherein the current value and gain and loss data are calculated using real time price data.

13. The method claimed in claim 1, wherein the liability balances include a margin borrowed balance.

14. The method claimed in claim 13, wherein the margin borrowed balance is associated with a hyperlink to a margin borrowed balance report.

15. The method claimed in claim 14, wherein the margin borrowed balance report describes margin transactions of the portfolio and a margin borrowed balance remaining after each of said margin transactions.

16. The method claimed in claim 1, wherein the liability balances include a margin interest balance.

17. The method claimed in claim 16, wherein the margin interest balance is associated with a hyperlink to a margin interest payable report.

18. The method claimed in claim 17, wherein the margin interest payable report describes margin interest transactions of the portfolio and a margin interest balance remaining after each of said margin interest transactions.

19. The method claimed in claim 1, wherein the liability balances include a taxes payable balance.

20. The method claimed in claim 19, wherein the taxes payable balance is associated with a hyperlink to a taxes payable report that displays short-term and long-term realized and unrealized gains and losses for securities currently held in the portfolio, short-term and long-term taxes payable for realized and unrealized gains and losses for said securities, and short-term and long-term taxes paid for realized gains and losses of said securities.

21. The method claimed in claim 20, wherein the unrealized gains and losses and the short-term and long-term taxes payable for said realized and unrealized gains and losses are calculated using real time price data.

22. The method claimed in claim 21, wherein the taxes payable include federal and state taxes that are calculated in accordance with user defined tax rates.

23. The method claimed in claim 1, wherein the equity balances include a cash invested balance.

24. The method claimed in claim 23, wherein the cash invested balance is associated with a hyperlink to a cash invested report.

25. The method claimed in claim 24, wherein the cash invested report describes cash invested transactions of the portfolio and a cash invested balance remaining after each of said cash invested transactions.

26. The method claimed in claim 1, wherein the equity balances include a net worth balance.

27. The method claimed in claim 26, wherein the net worth balance is associated with a hyperlink to a net worth report.

28. The method claimed in claim 27, wherein the net worth report includes gains and losses for securities of the portfolio, said gains and losses accounting for commissions, margin interest, and taxes.

29. The method claimed in claim 28, wherein said gains and losses include unrealized gains and losses for securities currently held in the portfolio that are calculated using real time price data to provide real time unrealized gains and losses.

30. The method claimed in claim 1, wherein the balances are calculated using real time price data to provide a real time financial position report.

31. The method claimed in claim 1, wherein said current prices are obtained in response to said request from a user for the financial position report.

32. The method claimed in claim 31, wherein the request is received through the Internet.

33. The method claimed in claim 1, wherein the transaction data records are accessed from a remote server through the Internet.

34. The method claimed in claim 1, further comprising:
calculating revenue and expense balances for the investment portfolio as a whole during a period of time using the transaction data records, wherein the sum of the revenue balances less the sum of the expense balances equals the net worth after taxes of the portfolio as a whole during said period of time;
wherein said financial position report further comprises a profit and loss section presenting said revenue and expense balances and said net worth after taxes for said period of time,
wherein revenue and expense balances of the profit and loss section are associated with hyperlinks to corresponding reports supporting the respective balances, and
wherein said processing further comprises, in response to receiving user input data representing user selection of one of said hyperlinks associated with one of said revenue and expense balances, transmitting a report supporting the balance associated with the selected hyperlink.

35. The method claimed in claim 34, wherein the revenue balances include a gains and losses balance.

36. The method claimed in claim 35, wherein the gains and losses balance is associated with a hyperlink to a gains and losses balance report.

37. The method claimed in claim 36, wherein the gains and losses balance report presents gross gains and losses excluding commissions and costs.

38. The method claimed in claim 36, wherein gains and losses balance report presents net gains and losses including commissions and costs.

39. The method claimed in claim 36, wherein the said gains and losses balance report includes bought value and realized and unrealized gains and losses of the portfolio.

40. The method claimed in claim 34, wherein said revenue balances include a dividends and interest balance.

41. The method claimed in claim 40, wherein said dividends and interest balance is associated with a hyperlink to a dividends and interest balance report.

42. The method claimed in claim 41, wherein the dividends and interest balance report describes dividend and interest transactions of the portfolio during said period and a dividends and interest balance remaining after each of said dividend and interest transactions.

43. The method claimed in claim 34, wherein said expenses balances include a commissions and costs balance.

44. The method claimed in claim 43, wherein said commissions and costs balance is associated with a hyperlink to a commissions and costs balance report.

45. The method claimed in claim 44, wherein the commissions and costs balance report describes commission and cost transactions of the portfolio during said period and a commissions and costs balance remaining after each of said commission and cost transactions.

46. The method claimed in claim 34, wherein said expenses balances include a margin interest balance.

47. The method claimed in claim 46, wherein said margin interest balance is associated with a hyperlink to a margin interest balance report.

48. The method claimed in claim 47, wherein the margin interest balance report describes margin interest transactions of the portfolio during said period and a margin interest balance remaining after each of said margin interest transactions.

49. The method claimed in claim 34, wherein said expense balances include a state and federal taxes balance.

50. The method claimed in claim 49, wherein said state and federal taxes balance is associated with a hyperlink to a tax expenses report that displays short-term and long-term realized and unrealized gains and losses, and short-term and long-term tax expenses for said realized and unrealized gains and losses.

51. The method claimed in claim 50, wherein said unrealized gains and losses and said short-term and long-term tax expenses for said realized and unrealized gains and losses are calculated using real time price data to provide real time unrealized gains and losses and real time short-term and long-term tax expenses for said realized and unrealized gains and losses.

52. The method claimed in claim 50, wherein said tax expenses include federal and state taxes that are calculated in accordance with user defined tax rates.

53. The method claimed in claim 34, wherein said balances are calculated using real time price data to provide a real time profit and loss activity report.

54. The method claimed in claim 34, further comprising:
receiving user input comprising transaction data characterizing a hypothetical what-if transaction;
recalculating said asset, liability and equity balances, said revenue and expense balances, and said net worth after taxes for the portfolio using said transaction data records and said what-if transaction data; and
transmitting to the user said financial position report using said recalculated asset, liability and equity balances, said recalculated revenue and expense balances, and said recalculated net worth after taxes.

55. The method claimed in claim 1, further comprising:
calculating a performance measure indicating a rate of return for the portfolio as a whole that accounts for holding periods of individual securities currently or previously held in the portfolio using said transaction data records; and
generating a report supporting said performance measure, wherein said financial position report further comprises said performance measure, and
wherein said performance measure is associated with a hyperlink to a corresponding report supporting the performance measure.

56. The method claimed in claim 55, wherein the performance measure is a return on securities associated with a hyperlink to a return on securities report.

57. The method claimed in claim 56, wherein the return on securities report presents gross gains and losses and gross return on investments excluding commissions and costs.

58. The method claimed in claim 56, wherein the return on securities report presents net gains and losses and net return on investments including commissions and costs.

59. The method claimed in claim 56, wherein the return on securities report includes months held, gains and losses and return on investment on a monthly and annual basis.

60. The method claimed in claim 59, wherein the return on securities report includes individual investments.

61. The method claimed in claim 60, wherein the said return on securities report includes the overall portfolio.

62. The method claimed in claim 55, wherein the performance measure is a cash return on securities associated with a hyperlink to a cash return on securities report that presents a return on cash invested.

63. The method claimed in claim 62, wherein the cash return on securities report presents gross gains and losses and gross return on investments excluding commissions and costs.

64. The method claimed in claim 62, wherein the cash return on securities report presents net gains and losses and net return on investments including commissions and costs.

65. The method claimed in claim 62, wherein the cash return on securities report includes months held, gains and losses, and return on investments on a monthly and annual basis.

66. The method claimed in claim 65, wherein the return on securities report includes the overall portfolio.

67. The method claimed in claim 55, wherein said current prices are obtained in response to a request from a user for the performance report.

68. The method claimed in claim 67, wherein said request specifies a period of time for the performance report.

69. The method claimed in claim 67, wherein said request is received through the Internet.

70. The method claimed in claim 55, wherein said transaction data records are accessed from a remote server through the Internet.

71. A programmable device for reporting financial information for an investment portfolio, the device including computer readable media storing programming code for controlling the device to perform processing comprising:
obtaining single entry transaction data records for individual transactions of the investment portfolio;
receiving a request for a financial position report for the investment portfolio;
calculating current double entry asset, liability and equity balances for the investment portfolio as a whole using the transaction data records and current prices for investments held in the investment portfolio, wherein the sum of the portfolio asset balances equals the sum of the portfolio liability balances and the portfolio equity balances, and wherein the liability balances include balances that reflect obligations that would result if all investments of the investment portfolio were liquidated at said current prices;

generating a financial position report for the portfolio that presents the asset, liability and equity balances of the portfolio in a double entry format, wherein at least some of the asset, liability and equity balances displayed in the financial position report are associated with hyperlinks to corresponding reports supporting the respective balances;

presenting the financial position report; and in response to user selection of one of said hyperlinks associated with one of said balances, presenting a report supporting the balance associated with the selected hyperlink.

72. The device claimed in claim 71, wherein said processing further comprises:

calculating revenue and expense balances for the investment portfolio as a whole during a period of time using the transaction data records, wherein the sum of the revenue balances less the sum of the expense balances equals the net worth after taxes of the portfolio as a whole during said period of time;

wherein said financial position report further comprises a profit and loss section presenting said revenue and expense balances and said net worth after taxes for said period of time, wherein revenue and expense balances of the profit and loss section are associated with hyperlinks to corresponding reports supporting the respective balances, and wherein said processing further comprises, in response to user selection of one of said hyperlinks associated with one of said revenue and expense balances, presenting a report supporting the balance associated with the selected hyperlink.

* * * * *